United States Patent [19]
Kataoka et al.

[11] Patent Number: 5,321,633
[45] Date of Patent: Jun. 14, 1994

[54] HEAT RADIATING TYPE LIQUID LEVEL SENSING SYSTEM AND THE METHOD THEREFOR

[75] Inventors: Ichiro Kataoka; Naoto Ishikawa; Yoshihito Aoki, all of Shizuoka, Japan

[73] Assignee: Yazaki Corporation, Japan

[21] Appl. No.: 886,593

[22] Filed: May 21, 1992

Related U.S. Application Data

[63] Continuation-in-part of Ser. No. 683,196, Apr. 10, 1991, abandoned.

[30] Foreign Application Priority Data

| Apr. 10, 1990 | [JP] | Japan | 2-93096 |
| Apr. 10, 1990 | [JP] | Japan | 2-93097 |
| Sep. 25, 1990 | [JP] | Japan | 2-251815 |
| Oct. 12, 1990 | [JP] | Japan | 2-272435 |
| Jan. 29, 1991 | [JP] | Japan | 3-2465 |

[51] Int. Cl.$^5$ .................. G01B 7/00; G01F 23/00
[52] U.S. Cl. ........................... 364/562; 73/295; 73/304 R
[58] Field of Search ............... 364/562; 324/691, 699, 324/703, 716, 295; 73/290 R, 304 R, 721, 113; 33/366

[56] References Cited

U.S. PATENT DOCUMENTS

| 4,163,391 | 8/1979 | Bezard et al. | 73/295 |
| 4,361,037 | 11/1982 | Hauschild et al. | 73/295 |
| 4,425,795 | 1/1984 | Albrecht et al. | 73/295 |
| 4,470,296 | 9/1984 | Kobayashi et al. | 73/113 |
| 4,619,140 | 10/1986 | Kühnel | 73/295 |
| 4,633,491 | 12/1986 | Kühnel | 377/20 |
| 4,640,127 | 3/1987 | Schneider | 73/295 |
| 4,890,491 | 1/1990 | Vetter et al. | 73/290 R |
| 4,912,646 | 3/1990 | Cerruti | 73/304 R X |
| 4,935,727 | 6/1990 | Re Fiorentin et al. | 73/304 R X |
| 4,943,797 | 7/1990 | Steffenhagen | 340/450 |
| 5,007,288 | 4/1991 | Sasaki et al. | 73/295 |
| 5,072,615 | 12/1991 | Nawrocki | 33/366 X |

FOREIGN PATENT DOCUMENTS

| 60-151519 | 9/1985 | Japan . |
| 63-308521 | 12/1988 | Japan . |
| 2157622 | 6/1990 | Japan . |
| 271708 | 6/1927 | United Kingdom . |

*Primary Examiner*—Jack B. Harvey
*Assistant Examiner*—Eric W. Stamber
*Attorney, Agent, or Firm*—Wigman, Cohen, Leitner & Myers

[57] ABSTRACT

To eliminate an ambient temperature correcting sensor and further to improve the sensor response speed in a heat radiating type liquid level sensing system, a constant current pulse is periodically passed through a level sensor to heat it; level sensor voltages sampled at predetermined time intervals when the level sensor is being heated are divided by each initial sensor voltage to obtain sensor voltage ratios with respect to time; an approximate voltage is calculated on the basis of the the obtained ratios in accordance with an approximation equation; a liquid level is calculated and displayed on the basis of the calculated approximate sensor voltage. Further, it is preferable that the system is provided with an additional inclination correcting sensor or an acceleration sensor, in order to correct the inclined liquid level.

10 Claims, 22 Drawing Sheets

FIG.1A
PRIOR ART
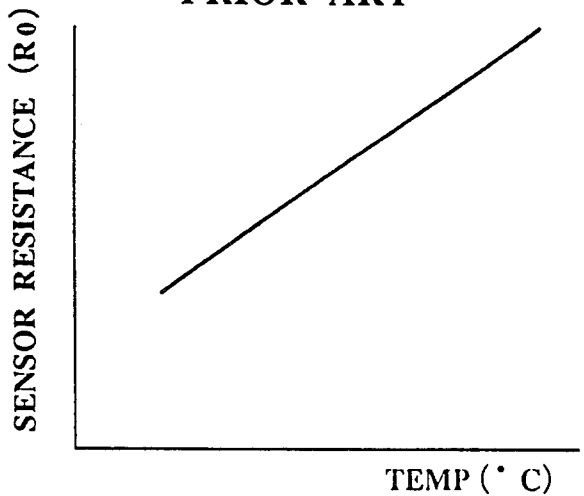
FIG.1B
PRIOR ART
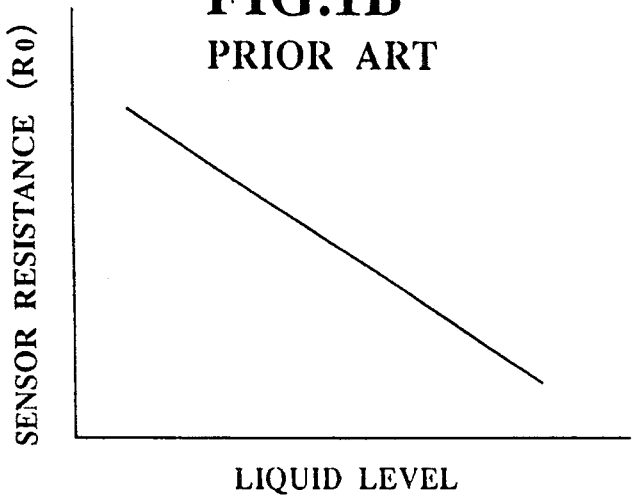
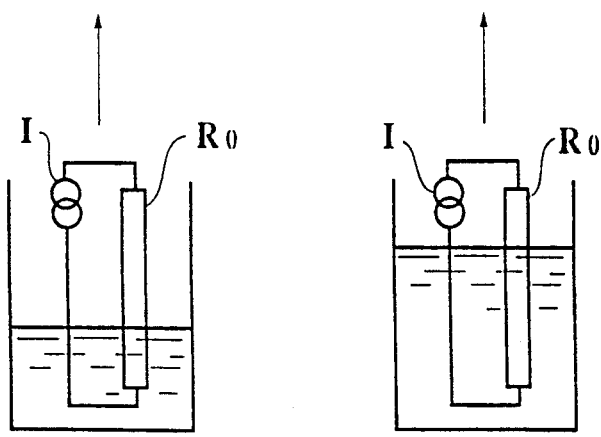

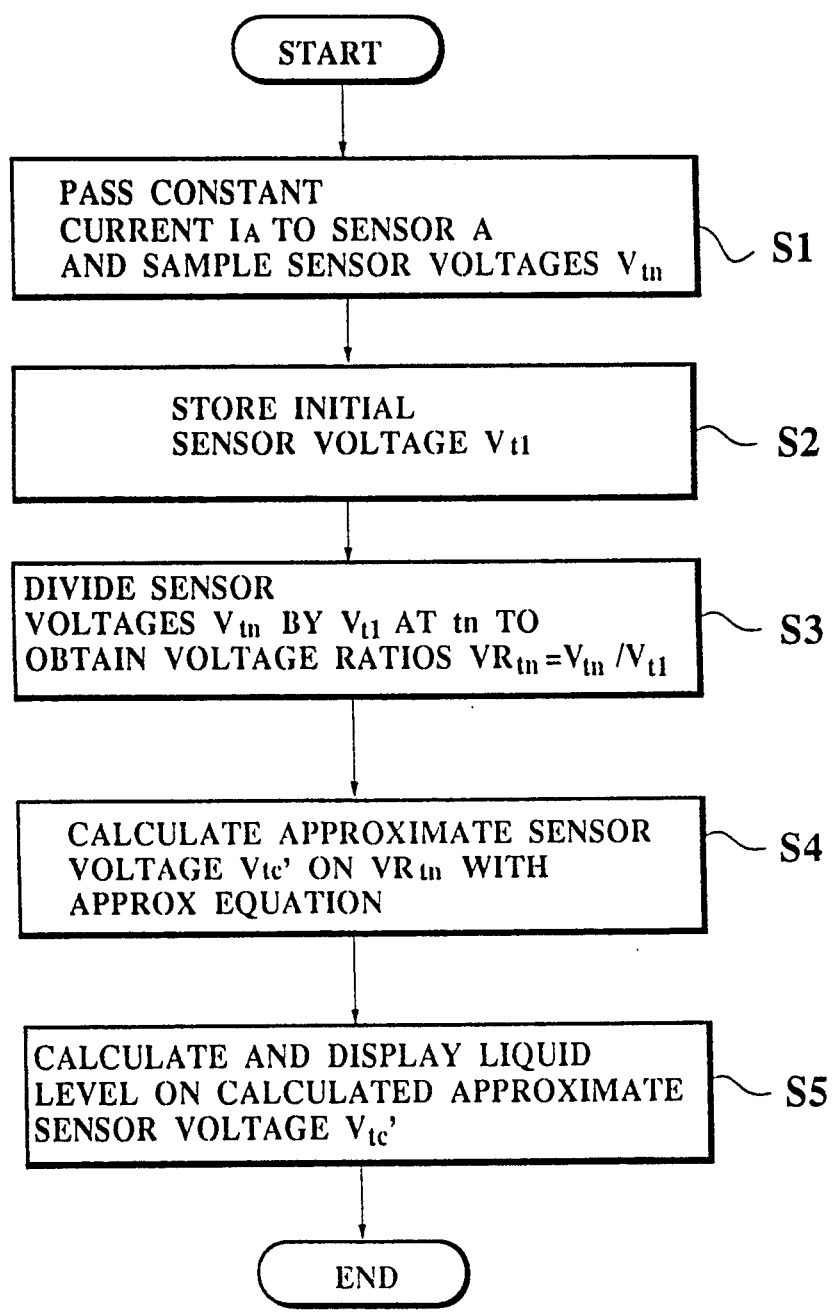

MESUREMENT TIME $V_{tc}'$ OBTAINED BY LINEAR
APPROX ON VOLTAGE RATIOS  $VR_{tn} = V_{tn}/V_{t1}$ $V_{tc}$ OBTAINED BY FLOWING
$I_A$ THROUGH SENSOR A TILL tc

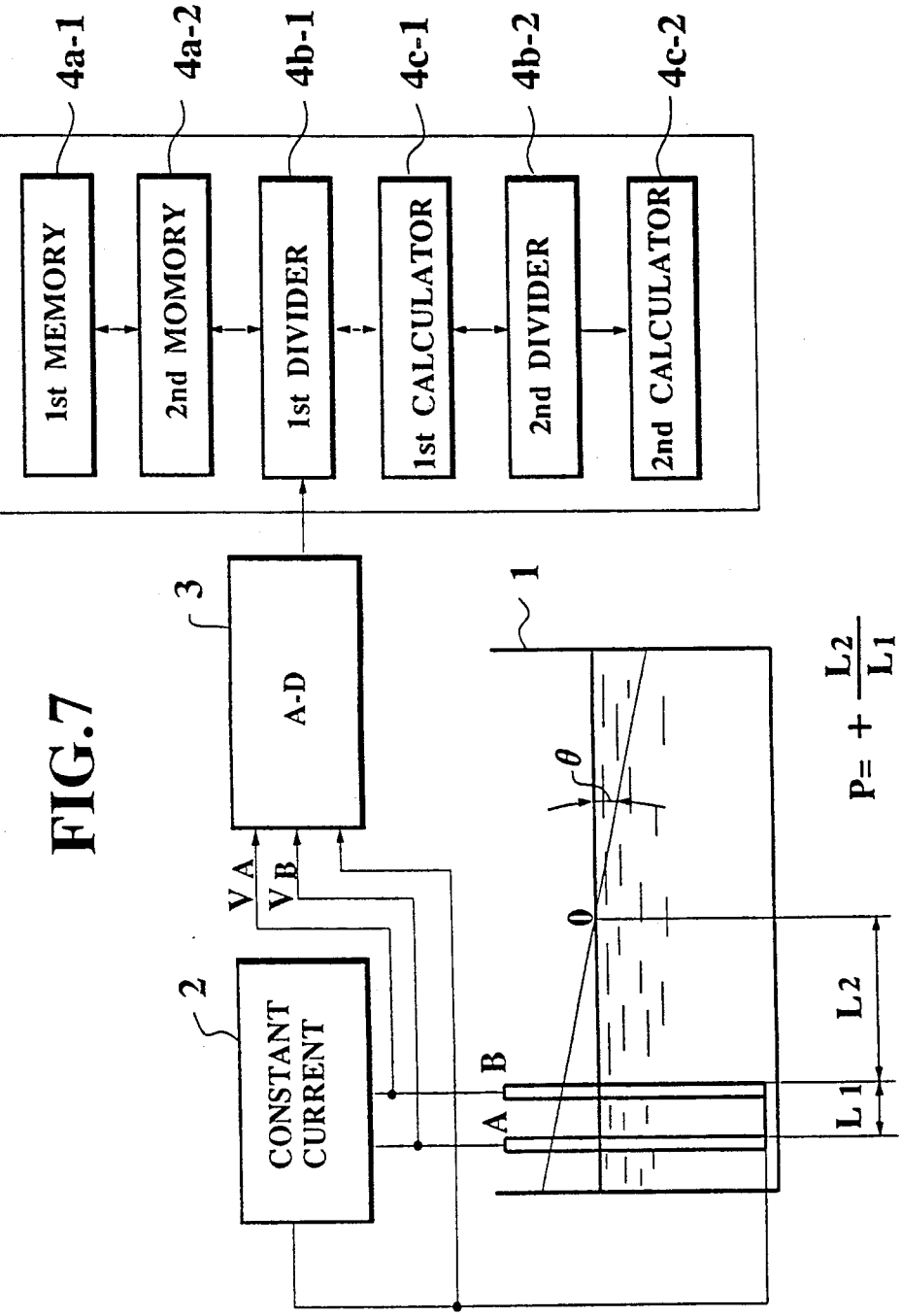

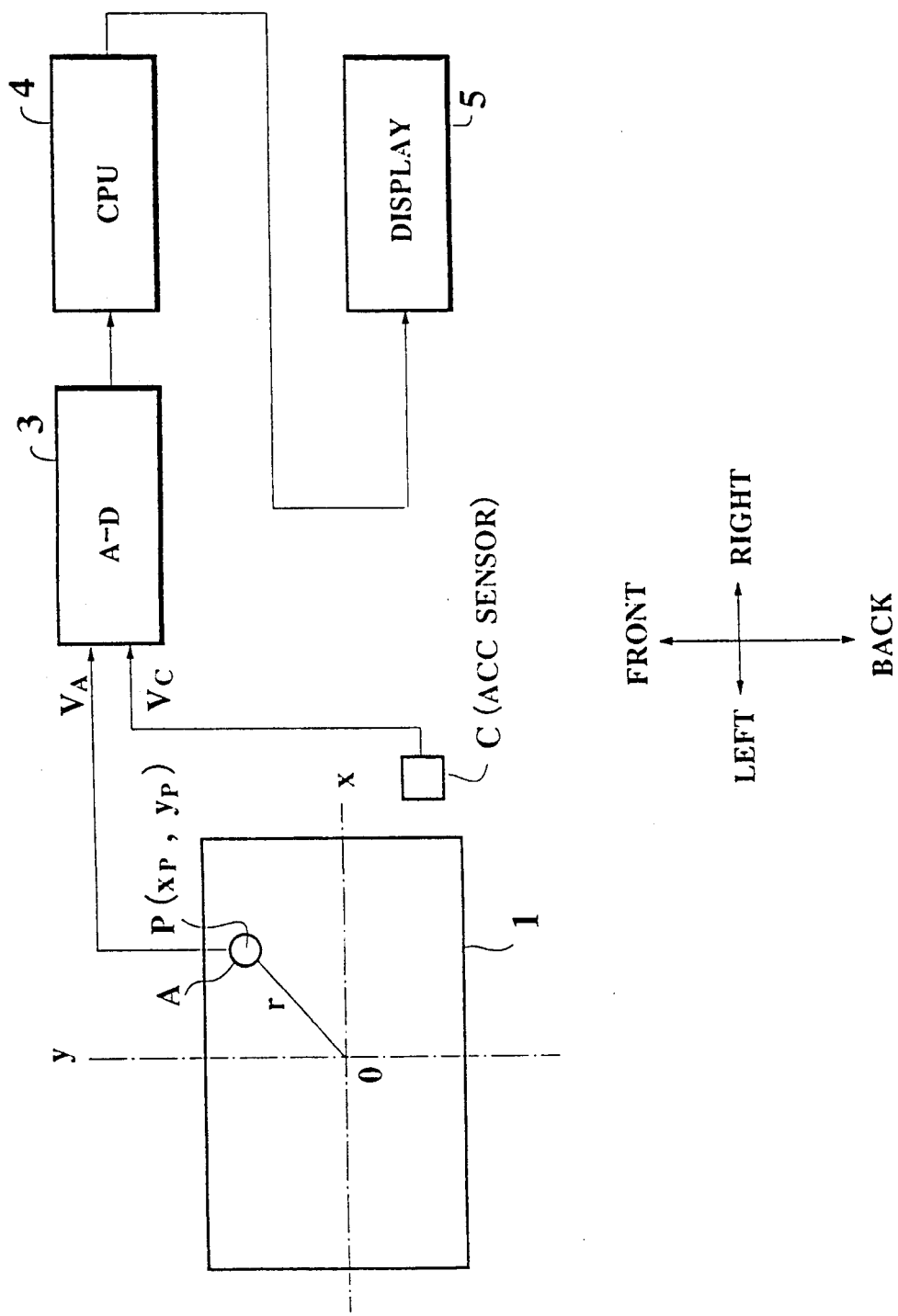

FIG.13A

| ACCEL'TION DIR | LIQUID LEVEL RISE MOTION | SYM | VEHICLE MOTION | LIQ LEVEL |
|---|---|---|---|---|
| FRONT-BACK | BACKWARD | Gb | ACCELERATION (UPHILL) | − |
|  | FRONTWARD | Gf | DECELERATION (DOWNHILL) | + |
| RIGHT-LEFT | LEFTWARD | Gl | RIGHT TURN | − |
|  | RIGHTWARD | Gr | LEFT TURN | + |
| UP-DOWN | UPWARD | Gu | MOVE UP | × |
|  | DOWNWARD | Gd | MOVE DOWN | × |

FIG.13B

| ACC COMBINATION | RESULTANT ACCELERATION | LIQUID LEVEL |
|---|---|---|
| $Gb + Gl$ | $-(Gb^2 + Gl^2)^{1/2}$ | − |
| $Gb + Gr$ | $a(Gb^2 - Gr^2)^{1/2}$<br>$\|Gb\| > \|Gr\| \to a < 0$<br>$\|Gb\| < \|Gr\| \to a > 0$ | −<br>+ |
| $Gf + Gr$ | $+(Gf^2 + Gr^2)^{1/2}$ | + |
| $Gf + Gl$ | $a(\|Gf^2 - Gl^2\|)^{1/2}$<br>$\|Gf\| > \|Gl\| \to a > 0$<br>$\|Gf\| < \|Gl\| \to a < 0$ | +<br>− |

FIG.14A

FROM S4
↓
DETECT ACC G BY SENSOR C — S21
↓
CALCULATE RESULTANT ACC $G_{res}$ ON G — S22
↓
CALCULATE CORRECTIVE SENSOR VOLTAGE $\Delta V_A$ ON $G_{res}$ — S23
↓
ADD $\Delta V_A$ TO $V_{tc}$ — S24
↓
TO S5

FIG.14B

FROM S4
↓
DETECT ACC COMPONENTS $G_x, G_y$ — S21A
↓
CALCULATE CORRECTIVE SENSOR VOLTAGE $\Delta V_A$ ON $G_x, G_y$ — S22A
↓
ADD $\Delta V_A$ TO $V_{tc}$ — S24A
↓
TO S5

HEAT RADIATING TYPE LIQUID LEVEL SENSING SYSTEM AND THE METHOD THEREFOR

RELATED APPLICATION

This application is a continuation-in-part of our prior copending application for U.S. Patent entitled the same and which was filed Apr. 10, 1991 and which bears Ser. No. 07/683,196, now abandoned.

BACKGROUND OF THE INVENTION

1. Field of the Invention

The present invention relates to a heat radiating type liquid level sensing system and a method of detecting a liquid level on the basis of change in resistance of a resistive level sensor immersed into a liquid, and more specifically to a heat radiating type liquid level sensing system and the method therefor suitable for use in sensing fuel level in a fuel tank of an automotive vehicle.

2. Description of the Prior Art

In general, the resistance of substance increases with increasing substance temperature, as shown in FIG. 1A. Therefore, when a resistive sensor rod Ro heated by a constant current generator I is partially immersed in liquid, since the immersed portion of the sensor rod is cooled by the liquid, the total resistance of the sensor rod Ro decreases with increasing immersion depth of the sensor rod Ro, that is, with increasing liquid level, as shown in FIG. 1B.

However, the level sensor of this type is of course subjected to a severe influence of the ambient temperature, in addition to the immersion depth of the level sensor rod. To overcome this problem, conventionally a temperature correcting resistor $r_t$ is additionally provided in the sensing circuit in such a way that the resistance of the correcting resistor $r_t$ changes only according to the ambient temperature, without being heated, as shown in FIG. 2A. In FIG. 2A, the prior-art level sensor circuit is composed of the level sensor rod Ro, the temperature correcting resistor $r_t$, a constant current generator I, a buffer amplifier op1, an operational amplifier op2, and a feedback resistor $r_f$ in order to reduce the influence of the ambient temperature.

In the prior-art liquid level sensor of this type, however, since the physical parameters and the liquid volume change (expands or contracts) according to ambient temperature and therefore the detected liquid level is still subjected to the influence of ambient temperature, there exists a problem in that it is still difficult to accurately detect liquid level.

SUMMARY OF THE INVENTION

With these problems in mind, therefore, it is the primary object of the present invention is to provide a heat radiation type liquid level sensing system which can sense liquid level at high precision at high response speed, without use of any additional ambient temperature correcting resistive rod, and the heat radiation type liquid level sensing method therefor.

To achieve the above-mentioned object, the heat radiating type liquid level sensing system, according to the present invention, comprises: (a) resistive level sensor means immersed in a liquid within a tank; (b) constant current generating means connected across said level sensor means, for periodically generating constant current pulse passed through said level sensor means to generate level sensor voltages; (c) storing means connected to said level sensor means, for storing an initial level sensor voltage; (d) dividing means connected to said level sensor means and said storing means, for dividing level sensor voltages sampled at predetermined time intervals when the level sensor is being heated by the constant current pulse, by the stored initial level sensor voltage, to obtain level sensor voltage ratios; (e) calculating means connected to said dividing means, for calculating an approximate level sensor voltage on the basis of the obtained level sensor voltage ratios in accordance with approximation formulae, and a liquid level on the basis of the calculated approximate level sensor voltage in accordance with a proportional equation; and (f) displaying means connected to said calculating means, for displaying the calculated liquid level.

Further, to correct the inclined liquid level, the sensing system further comprises: (a) resistive inclination correcting sensor means immersed in the liquid and heated by the constant current pulse generated by said constant current generating means; (b) second storing means connected to said inclination correcting sensor means, for storing an initial correcting sensor voltage; (c) second dividing means connected to said inclination correcting level sensor means and said second storing means, for dividing correcting sensor voltages sampled at predetermined time intervals when the correcting sensor is being heated, by the stored initial correcting sensor voltage, to obtain correcting sensor voltage ratios; (d) second calculating means connected to said second dividing means, for calculating an approximate correcting level sensor voltage on the basis of the obtained correcting level sensor voltage ratios in accordance with approximation formulae, and an approximate horizontal liquid level sensor voltage on the basis of the two calculated approximate sensor voltages in accordance with a proportional equation as $$V_0 = V_{Btc}' + P(V_{Btc}' - V_{At\,c}')$$

$$P = L_2/L_1$$

where $V_0$ denotes the approximate horizontal level sensor voltage obtained when the tank is not inclined; $V_{Atc}'$ denotes the calculated approximate level sensor voltage; $V_{Btc}'$ denotes the calculated approximate correcting level sensor voltage; $L_1$ denotes a distance between said level sensor means and said inclination correcting sensor means; and $L_2$ denotes a distance between the correcting sensor means and a neutral level plane on a liquid in the tank.

To achieve the above-mentioned object, the method of sensing liquid level according to the present invention comprises the steps of: (a) passing constant current pulse ($I_A$) through a heat radiating liquid level sensor (A) to periodically heat the level sensor; (b) detecting level sensor voltages ($V_{Atn}$) sampled at predetermined time intervals when the level sensor is being heated; (c) storing an initial level sensor voltage ($V_{At1}$); (d) dividing the detected level sensor voltages ($V_{Atn}$) by the stored initial level sensor voltage ($V_{At1}$) to obtain level sensor voltage ratios ($V_{Atn}/V_{At1}$) with respect to time; (e) calculating an approximate sensor voltage ($V_{Atc}'$) on the basis of the obtained voltage ratios in accordance with an approximation equation; and (f) calculating a liquid level (X) on the basis of the calculated approximate sensor voltage ($V_{tc}'$).

Further, to correct the inclined liquid level, the sensing method further comprises the steps of: (a) passing constant current pulse through an inclination correcting sensor to periodically heat the correcting sensor; (b) detecting correcting sensor voltages sampled at predetermined time intervals when the correcting sensor is being heated; (c) storing an initial correcting sensor voltage; (d) dividing the detected correcting sensor voltages by the stored initial correcting sensor voltage to obtain correcting sensor voltage ratios with respect to time; (e) calculating an approximate correcting level sensor voltage on the basis of the obtained correcting level sensor voltage ratios in accordance with an approximation equation and an approximate horizontal liquid level on the basis of the two calculated approximate sensor voltages in accordance with a proportional equation as $$V_0 = V_{Btc}' + P(V_{Btc}' - V_{Atc}')$$

$$P = L_2/L_1$$

where $V_0$ denotes the approximate horizontal level sensor voltage obtained when the tank is not inclined; $V_{Atc}'$ denotes the calculated approximate level sensor voltage; $V_{Btc}'$ denotes the calculated approximate correcting level sensor voltage; $L_1$ denotes a distance between said level sensor means and said inclination correcting sensor means; and $L_2$ denotes a distance between the correcting sensor and a neutral level plane on a liquid in the tank.

In the sensing system and the sensing method according to the present invention, since the level sensor is not yet heated at the initial stage, when the sampled sensor voltages $V_{tn}$ are divided by the initial sensor voltage $V_{t1}$, it is possible to eliminate the influence of ambient temperature without providing an additional sensor. Further, since the approximate sensor voltage $V_{tc}'$ can be calculated on the basis of and the calculated voltage ratios $(V_{tn}/V_{t1})$ in accordance with a approximation equation, it is possible to increase the response speed of the system.

BRIEF DESCRIPTION OF THE DRAWINGS

FIG. 1A is a graphical representation showing the general relationship between sensor resistance Ro and temperature;

FIG. 1B is a graphical representation showing the relationship between sensor resistance Ro and liquid level;

FIG. 5 is a flowchart for assistance in explaining the sensing procedure of a first embodiment of the sensing system according to the present invention;

FIG. 7 is a schematic block diagram showing a second embodiment thereof;

FIG. 12 is a schematic block diagram showing a third embodiment thereof;

FIG. 13A is a table showing the relationship among vehicle acceleration direction, liquid level rising area within the tank, vehicle motion and liquid level change;

FIG. 13B is a table showing combinations of four vehicle accelerations when the vehicle is accelerated, decelerated, turned rightward or leftward;

FIG. 14A is a flowchart for assistance in explaining the sensing procedure of the third embodiment thereof;

FIG. 14B is a flowchart for assistance in explaining the sensing procedure of a modification of the third embodiment thereof;

DETAILED DESCRIPTION OF THE PREFERRED EMBODIMENTS

Figure 2A:
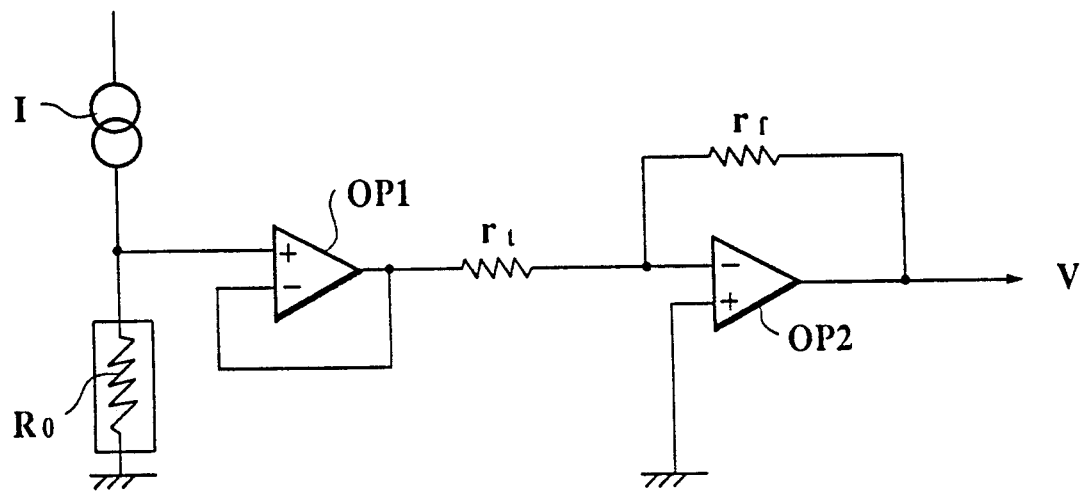
FIG. 2A is a circuit diagram showing an example of prior-art liquid level sensing circuit.
Figure 2B:
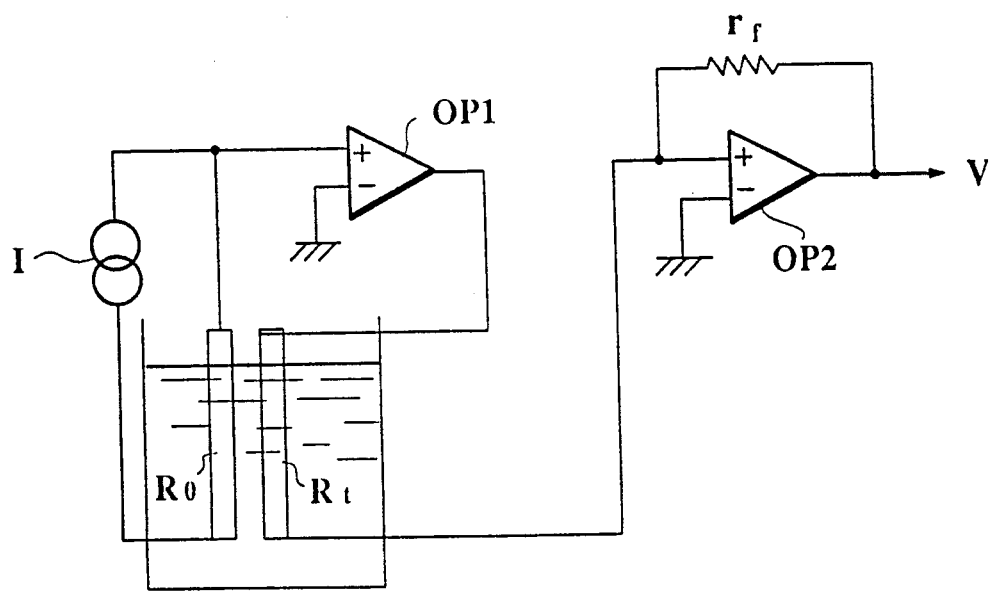
FIG. 2B is a circuit diagram showing a liquid level sensor apparatus proposed by the same inventors.

To overcome the afore-mentioned problems, the same inventors and the same applicant have already proposed a liquid level sensing apparatus, as shown in FIG. 2B, such that a resistive level sensor rod Ro and a resistive temperature correcting rod Rt are both immersed in liquid in parallel arrangement side by side and further the temperature coefficient of the resistive substance of the level sensor rod Ro is determined equal to that of the temperature correcting rod Rt, without heating the temperature correcting rod, in order to eliminate the influence of ambient temperature, as disclosed in Japanese Published Unexamined (Kokai) Pat. Appli. No. 2-157622 (published Jun. 18, 1990).

In the above-mentioned apparatus, although the level sensor rod Ro and the temperature correcting rod Rt are both immersed in liquid, since the correcting rod is not heated, the resistance of the correcting rod changes according to only ambient temperature without being subjected to the influence of change in liquid level, so that it is possible to more accurately measure liquid level.

In the above-mentioned method, however, since the sensor rod and the correcting rod are both formed by winding Ni wire around the outer circumference of a rod-shaped sensor body, there exists a problem in that the sensor is heated gradually by current passing therethrough due to the heat capacitance of the sensor and therefore it takes several minutes to obtain a stable resistance, in particular where liquid level is low in a tank and therefore the immersion depth of the sensor rod is small. In other word, there still exists a problem in that liquid level will not be detected accurately before the sensor rod is heated into a stable condition.

In addition, since the resistance of the correcting rod is higher than that of the sensor rod, the length of the Ni wire of the correcting rod is larger than that of the Ni wire of the sensing rod and therefore the heat capacitance thereof is different from that of the sensor rod, so that there exists a difference in temperature between the sensor and correcting rods when ambient temperature changes, thus resulting in error in liquid level sensing operation.

In view of the above description, reference is now made to the basic embodiment of the heat radiating type liquid level sensing system according to the present invention, with reference to FIGS. 3 to 6.

Figure 3:
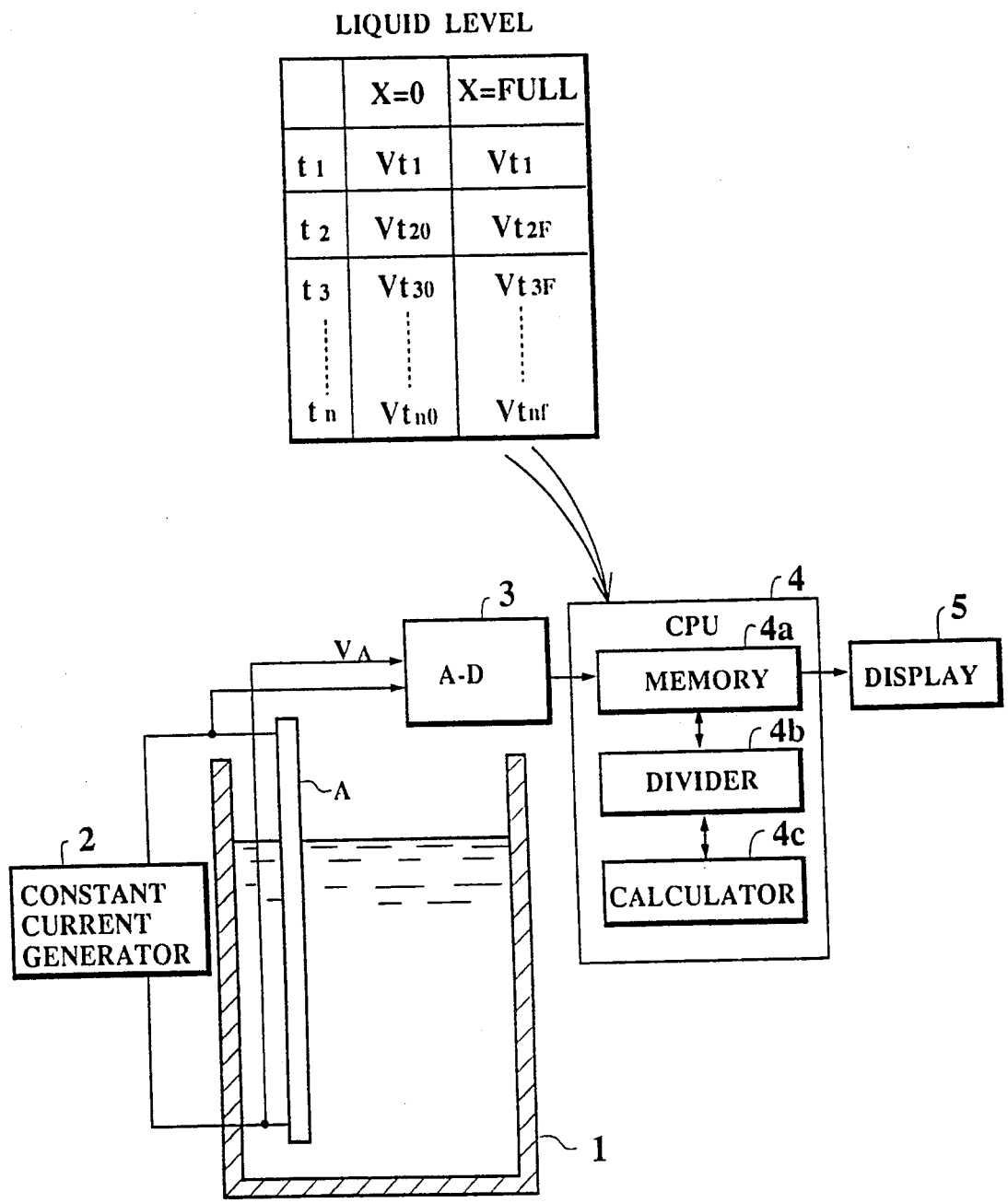
FIG. 3 is a schematic block diagram showing a first embodiment of the liquid level sensing system according to the present invention.

In FIG. 3, a liquid level sensor A made of a resistive substance and formed into heat radiation type is partially immersed in liquid (e.g. fuel) within a tank (e.g. fuel tank) 1. A constant current pulse generator 2 is connected across the level sensor A to periodically pass a constant current $I_A$ through the level sensor A to heat the level sensor A. Voltage $V_A$ across the level sensor A is applied to an A-D convert 3 to convert an analog sensor voltage $V_A$ into a digital sensor voltage. The converted digital voltage is applied to a CPU 4 including a memory section 4a, a divider section 4b, a calculator 4C, etc. The calculated liquid level is displayed on a display unit 5 in the form of digital indication, preferably.

As already explained, in general the resistance of a substance (i.e. nickel) increases with increasing temperature, as shown in FIG. 1A. Further, since the sensor rod periodically heated by a constant current pulse generated by the pulse generator 2 is cooled by the liquid, the resistance of the level sensor A decreases with increasing liquid level, as shown in FIG. 1B.

Figure 4A:
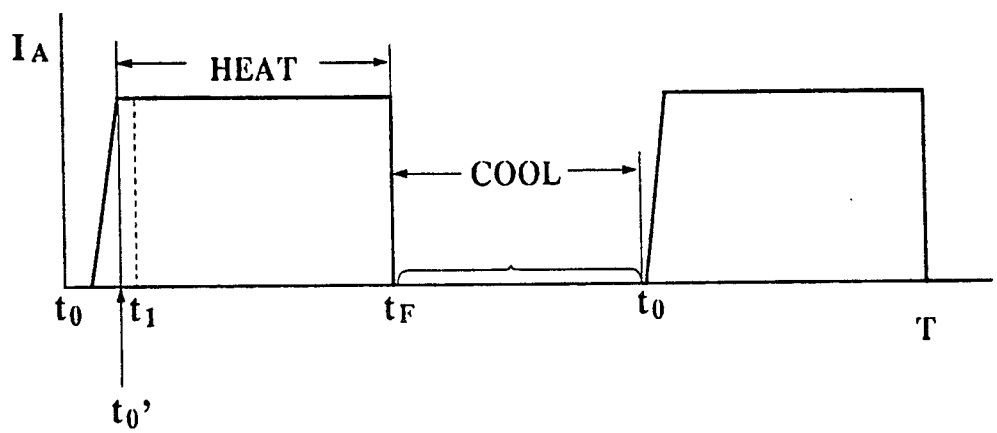
FIG. 4A is a waveform diagram showing a constant current pulse passed through the liquid level sensor.
Figure 4B:
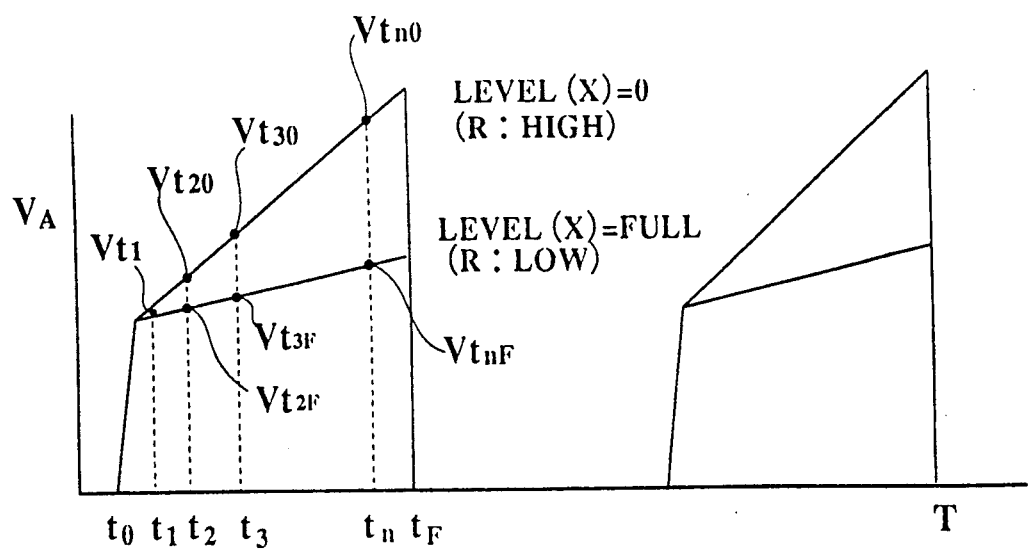
FIG. 4B is a waveform diagram showing sensor voltages $V_{tn}$ sampled at times $t_1$ to $t_n$, in which $V_{tn0}$ indicates sampled sensor voltages when the liquid level is zero (X=0) and $V_{tnF}$ indicates those when the liquid level is full (X=FULL).

The constant current pulse generator 2 generates a current pulse $I_A$, as shown in FIG. 4A, having a rise time from $t_0$ to $t'_0$, an on-time (heating time) from $t_0$ to $t_F$, and, an off-time (cooling time) from $t_F$ to $t_0$. The period of this current pulse $I_A$ is determined to be about 5 seconds for instance. Therefore, when the liquid level X is zero, since the level sensor A is not cooled by the liquid and therefore the sensor temperature is relatively high, the sensor resistance is relatively high, so that the sensor voltage $V_A$ across the level sensor A is relatively high as shown in FIG. 4B. On the other hand, when the liquid level X is full, since the level sensor A is cooled by the liquid and therefore the sensor temperature is low, so that the sensor voltage $V_A$ across the level sensor A is relatively low also as shown in FIG. 4B. In more detail with reference to FIG. 4B, the sensor voltage $V_A$ increase at a large gradient from $V_{t1}$ to $V_{tn0}$ at zero level (X=0) but at a small gradient from $V_{t1}$ to $V_{tnF}$ at full level (X=FULL). Therefore, the sensor voltages $V_A$ according to the liquid level are sequentially stored in the memory 4a together with the time data, after each constant current pulse $I_A$ has been passed through the level sensor A, as shown by a table in FIG. 3. Here, the sensor voltage $V_{t1}$ at $t_1$ is an initial sensor voltage before the sensor A is heated by the constant current $I_A$.

With reference to a flowchart shown in FIG. 5, the liquid level sensing procedure of the system shown in FIG. 3 will be described hereinbelow, which is executed in accordance with a program stored in a ROM (not shown) included the CPU 4.

Control first pass a constant current $I_A$ to the sensor rod A at time $t_0$ (in step S1), and stores an initial sensor voltage $V_{t1}$ a short time after the current $I_A$ has risen at time $t_0$, (in step S2). Control detects voltages $V_{t2}$ to $V_{tn}$ sampled in sequence at times $t_2$ to $t_n$ and divides these sampled voltages $V_{tn}$ by the initial voltage $V_{t1}$ to obtain an sensor voltage ratios $VR_{tn}$ (in step S3). Here, it should be noted that since the initial sensor voltage $V_{t1}$ is determined by only the ambient temperature (before heated by the constant current pulse), the ratio $VR_{tn} = V_{tn}/V_{t1}$ excludes the influence of the ambient temperature.

Figure 6:
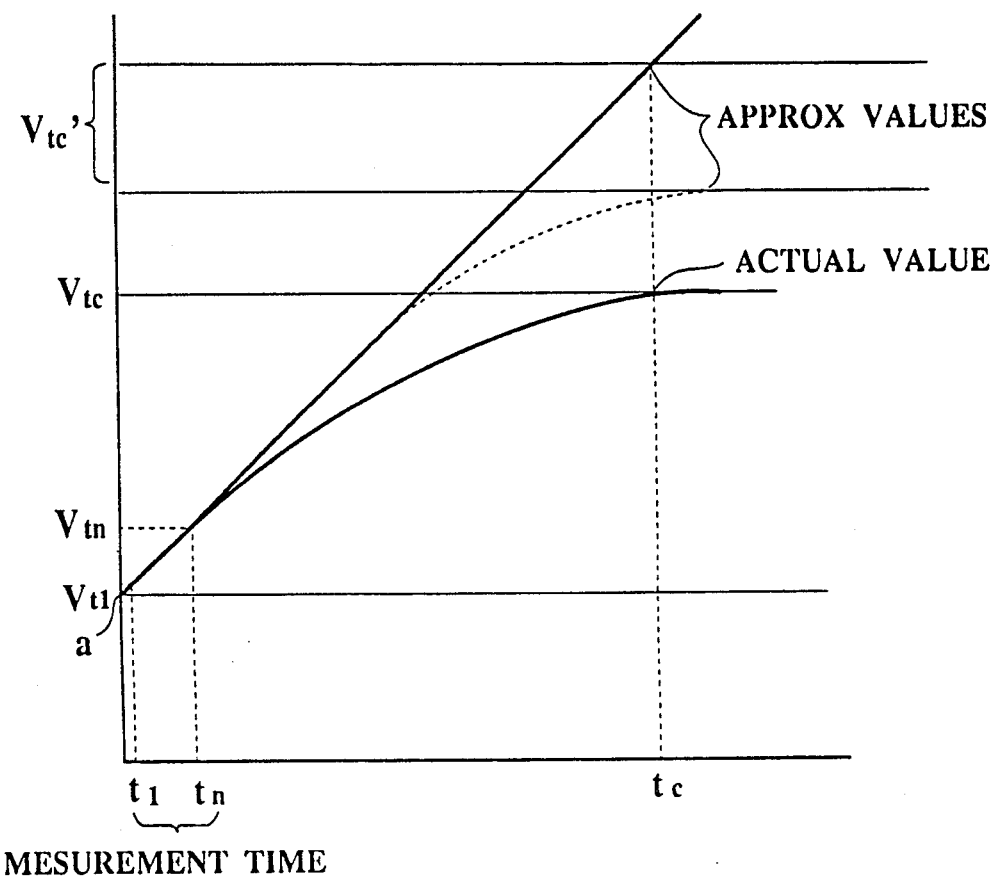
FIG. 6 is a graphical representation for assistance in explaining a linear approximation calculation and an exponential (time constant curve) approximation.

After a predetermined time $t_n$ has elapsed, control calculates an approximate sensor voltage $V_{tc}'$ on the basis of the obtained voltage ratios and in accordance with a calculating formula corresponding to a linear approximation equation or an exponential approximation equation previously stored in the CPU 3, as shown in FIG. 6 (in step S4).

With reference to FIG. 6, the linear approximation equation will be explained hereinbelow in further detail. As already described, the sensor voltages are sampled at times $t_1$, $t_2$, - - - $t_n$ to obtain sensor voltages $V_{t1}$, $V_{t2}$, - - - $V_{tn}$ ($V_{tn}$) as shown in FIG. 3. The initial voltage $V_{t1}$ is stored. Control divides these sensor voltages $V_{tn}$ by $V_{t1}$ at $t_1$, $t_2$, - - - $t_n$ (see FIG. 4B) to obtain sensor voltage ratios $VR_{t2}$, $VR_{t3}$, - - - $VR_{tn}$ ($VR_{tn}$). In this calculation, since the initial sensor voltage $V_{t1}$ indicates the value obtained immediately after the sensor current has passed through the sensor A and therefore determined by only the ambient temperature, it is possible to eliminate the influence of ambient temperature by using these voltage ratio $VR_{tn} = V_{tn}/V_{t1}$. On the basis of these voltage ratios $VR_{tn}$, an approximated value $V_{tc}'$ (see FIG. 6) corresponding to the value $V_{tc}$ actually obtained when the sensor current has passed till the time $tc$ is obtained in accordance with the linear approximation equation as follows:

$$V_{tc}' = a + b \cdot tc$$

$$S(t_n, t_n) = \Sigma t_n^2 - (\Sigma t_n)^2/n$$

$$S(VR_{tn}, VR_{tn}) = \Sigma(VR_{tn})^2 - (\Sigma VR_{tn})^2/n$$

$$S(t_n, VR_{tn}) = \Sigma t_n \cdot VR_{tn} - (\Sigma t_n)(\Sigma VR_{tn})/n$$

$$\overline{t_n} = \Sigma t_n/n$$

$$\overline{VR_{tn}} = \Sigma VR_{tn}/n$$

$$a = \overline{VR_{tn}} - b\overline{t_n}$$

$$b = S(t_n, VR_{tn})/S(VR_{tn}, VR_{tn})$$

where a denotes the intercept (see FIG. 6) and b denotes the gradient, and $V_{tc}'$ is substantially proportional to $V_{tc}$.

In the case of the exponential approximation equation, the following equation can be used.

$$V_{tc}' = \beta_0 + \beta_1 VR_{t1} + \beta_2 VR_{t2} + \cdots + \beta_n VR_{tn}$$

where the coefficients $\beta_0, \cdots \beta_n$ are determined by various factors such as sensor heat capacity, sensor thermal resistance, sensor cross sectional area, etc.

In the level sensor A of heat radiating type, since the heat capacitance of the level sensor A is relatively large, it is impossible to simply obtain a steady state sensor voltage $V_{tc}$. Therefore, the sensor voltage $V_{tc}'$ is approximated in accordance with an approximation equation, in order to increase the response speed. In this calculation, although it is of course possible to calculate the approximate sensor voltage $V_{tc}'$ in accordance with a linear approximation as shown in FIG. 6, since the error between the actual value $V_{tc}$ and the calculated value $V_{tc}'$ is relatively large (although $V_{tc}$ is proportional to $V_{tc}'$), it is preferable to adopt the approximation in accordance with the exponential approximation. Further, if the period of the constant current pulse is 3 sec; the duration between $t_1$ and $t_n$ is 3 sec; and the sampling time intervals are 10 msec, so that 300 sensor voltages can be sampled, for instance.

On the basis of the calculate approximate sensor voltage $V_{tc}'$ control calculates the present liquid level and displays it on the display unit preferably in the form of digital indication (in step S5).

The relationship between the steady-state voltage $V_{tc}$ (see FIG. 6) and the liquid level X will be explained in further detail. The sensor voltage $V_{tc}$ is proportional to the liquid level as follows:

$$V_{tc}(X) = IR_0' \{x/(1-ak) + (L-x)/(1-k)\}$$

where X denotes the liquid level; L denotes the total length of the sensor; k denotes the physical value exerting influence upon the sensor thermal resistance; ak denotes the physical value exerting influence upon the sensor thermal resistance when the sensor is dipped in a liquid; and Ro' denotes the resistance value per unit length of the resistor Ro.

Here, the approximate sensor voltage value $V_{tc}'$ is also proportional to the steady-state voltage $V_{tc}$ as $$V_{tc}'(X) = C \; V_{tc}(X) = C \\ IR_0'\{X/(1-ak) + (L-X)/(1-k)\}$$

where C denotes a proportional constant.

Further, the above-mentioned relationship between the sensor voltages $V_{tc}$ and the liquid levels X can be previously determined empirically according to the kind of liquid to be measured.

As described above, the approximated sensor voltage $V_{tc}'$ is obtained on the basis of the data $VR_{tn}$ at times $t_1$, $t_2$, - - - $t_n$ in accordance with the afore-mentioned approximation equations.

Here, when the constant current is passed through the sensor at the initial stage, since the sensor is not yet heated, it is possible to regard the initial sensor voltage $V_{t1}$ as an initial sensor voltage representative of ambient temperature. Therefore, when the sensor voltages $V_{tn}$ sampled after the sensor has been heated are divided by the initial sensor voltage $V_{t1}$, it is possible to obtain the sensor voltage ratios $V_{tn}/V_{t1}$ not subjected to the influence of ambient temperature. Further, since the sensor voltages $V_{tn}$ are sampled at predetermined time intervals (e.g. 100 ms), it is possible to obtain ratios $V_{tn}/V_{t1}$ of sensor voltages with respect to time, and further to calculate the approximate sensor voltage $V_{tc}'$ on the basis of linear approximation or exponential approximation (along a predetermined time constant curve), in order to reduce the measurement time or to increase the response time.

In the liquid level sensing system as described above, since it is possible to eliminate the temperature correcting rod Rt (shown in FIG. 2B) immersed in liquid in parallel arrangement with the level sensor rod, a detection error due to difference in heat capacitance and resistance with respect to temperature and temperature coefficient between the level sensor and the temperature correcting sensor can be eliminated. Further, since the approximate sensor voltage $V_{tc}'$ can be calculated on the basis of sampled data obtained in transient condition, it is possible to improve the response speed of the liquid level measurement.

With reference to FIGS. 7 to 11, a second embodiment of the liquid level sensing system according to the present invention will be described hereinbelow.

Where the sensing system is used for detecting liquid level of fuel in a fuel tank for an automotive vehicle, there inevitably exists a measurement error due to inclination of fuel level when the vehicle is accelerated, decelerated, or driven along a corner or on an upward or downward sloping road.

To overcome the above-mentioned problem, the same inventors and the same applicant have proposed a liquid level sensing apparatus provided with both a level sensor and an inclination correcting sensor in Japanese Published Unexamined (Kokai) Pat. Appli. No. 63-308521 (published Dec. 15, 1988). In this liquid sensing apparatus, a fuel level in horizontal condition is calculated on the basis of difference in sensor voltage between the level sensor and the inclination correcting sensor, on assumption that the fuel level is inclined about roughly a neutral point (e.g. oscillating center) 0 (shown in FIG. 7) within a fuel tank 1. That is, a corrected fuel level voltage can be obtained on the basis of the proportional relationship between distances $L_1$ and $L_2$ and voltages $V_A$ and $V_B$ of both the liquid and correcting sensors A and B (shown in FIG. 7) and in accordance with the following proportional equation as $$V = V_B + P(V_B - V_A)$$

$$P = +L_2/L_1$$

where V denotes the corrected fuel level voltage; $V_A$ is a liquid sensor voltage; $V_B$ is a inclination correcting sensor voltage; $L_1$ denotes a distance between the two sensors A and B; and $L_2$ denotes a distance between the correcting sensor B and the neutral point 0, as depicted in FIG. 7.

Figure 8A:
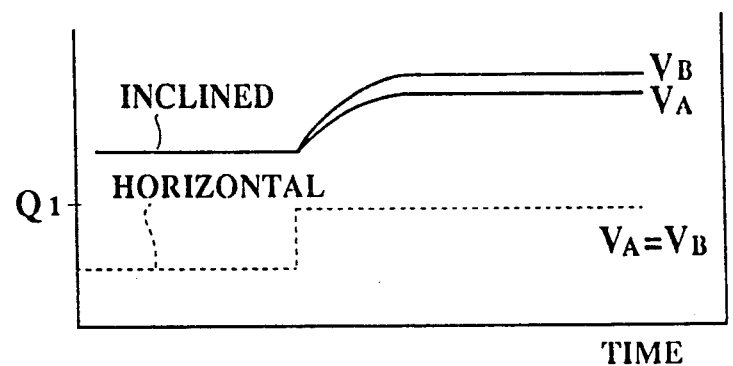
FIG. 8A is a waveform diagram for assistance in explaining a delay of two sensor voltages after the liquid level has been inclined due to vibration.

In the prior-art liquid sensing apparatus, however, since these sensors are formed by winding Ni wire around a rod-shaped insulating body, the heat capacitance of each of these sensors is relatively large and thus it takes a considerable time until two sensor voltages $V_A$ and $V_B$ become stable into the steady state as shown in FIG. 8A. Accordingly, there exists a problem in that the response speed is low, with the result that measurement error is inevitably produced when the fuel surface is frequently inclined.

To overcome the above-mentioned problem, the second embodiment calculates the two sensor voltages of the liquid level and inclination correcting sensors in almost the same way as in the first embodiment shown in FIG. 3, and calculates a horizontal level on the basis of these two voltages and in accordance with a proportional equation. In comparison with the first embodiment, the second embodiment additionally comprises an inclination correcting sensor B, a second memory 4a-2, a second divider 4b-2 and a second calculator 4c-2, as shown in FIG. 7. The liquid level sensor A is disposed a distance $(L_1 + L_2)$ away from the neutral point 0 and the inclination correcting sensor B is disposed a distance $L_2$ away therefrom. Further, the level sensor A generates a first sensor voltage $V_A$ and the correcting sensor B generates a second sensor voltage $V_B$.

Figure 9A:
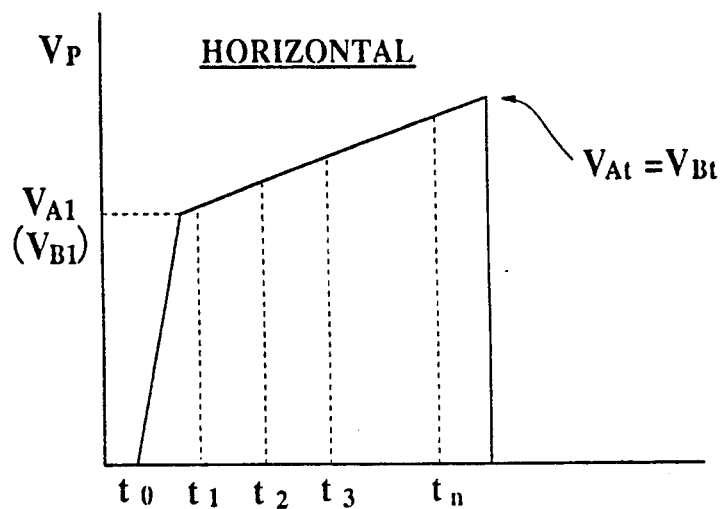
FIG. 9A is a waveform diagram showing two sensor voltages when the liquid level is horizontal.
Figure 9B:
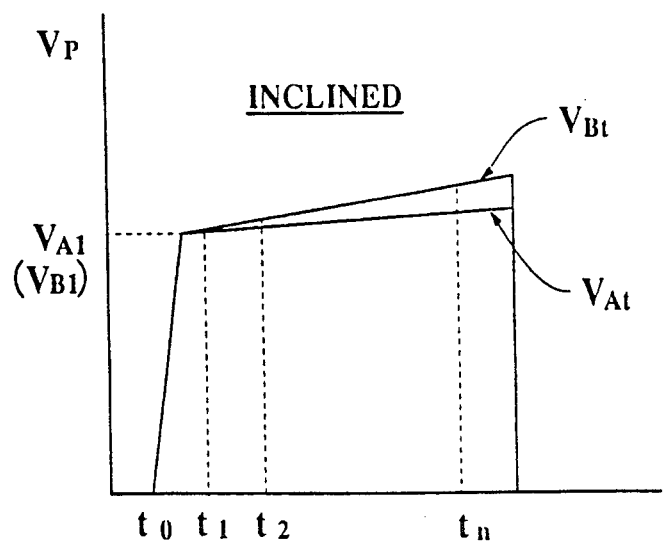
FIG. 9B is a waveform diagram showing two sensor voltages when the liquid level is inclined.

In the same way as in the first embodiment, when the constant current is passed through these two sensors A and B at a period of 3 sec and the sampling time intervals are 10 msec, 300 sensor voltages $V_A$ and $V_B$ can be sampled from times $t_1$ to $t_n$. In this embodiment, if the liquid level is horizontal, the two sensor voltages $V_{At}$ and $V_{Bt}$ are equal to each other as shown in FIG. 9A at each sampling time. However, when the liquid level is inclined, the inclination correcting sensor voltage $V_{Bt}$ increases at a larger gradient than that of the liquid level sensor voltage $V_{At}$ as shown in FIG. 9B, as far as the liquid level is inclined in the direction as shown in FIG. 7. The difference in sensor voltage between the two increases with increasing inclination angle $\theta$ (shown in FIG. 7) of the liquid surface.

Figure 9C:
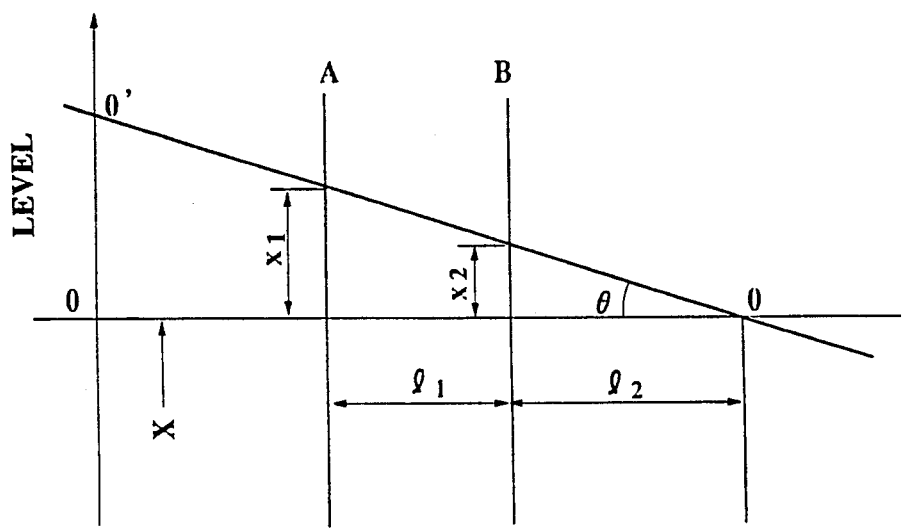
FIG. 9C is a graphical representation for assistance in explaining the method of compensating for the inclined liquid level by the method according to the present invention.

The principle of compensating for the liquid level inclination will be described in further details hereinbelow. With reference to FIG. 9C, two sensors A and B are arranged within a tank and dipped into a liquid. The total length of both the sensors A and B is L and the resistance per each unit length is $R_0'$. The liquid level obtained when the tank is not inclined is X. The liquid level from the horizontal level 0—0 obtained when the tank is inclined is $x_1$ in the sensor A and $x_2$ in the sensor B. The distance between the sensor and the neutral point 0 (at which the level is kept unchanged even when the tank is inclined) is $(l_1 + l_2)$ in the sensor A and $l_2$ in the sensor B.

When a constant current I is passed through the two sensors A and B, the resistances of the two sensors A and B obtained when the tank is not inclined are $$R_0 = R_A = R_B = R_0'\{X/(1-k) + (L-X)/(1-k)\} \quad (1)$$

where k denotes the physical value exerting influence upon the sensor thermal resistance.

Therefore, the sensor voltage $V_0$ obtained when the tank is not inclined is $$V_0 = IR_0 = IR_A = IR_B \quad (2).$$

However, when the tank is inclined to an inclination angle $\theta$, since the liquid level changes from the horizontal line 0—0 to the inclined line 0—0', the sensor A is dipped into the liquid by a length $X + x_1$ and the sensor B is dipped by a length $X + x_2$. Therefore, the two sensor resistances obtained when the tank is inclined are $$R_{A\theta} = R_0'\{(X+x_1)/(1-ak) + (L-X-x_1)/(1-k)\} \quad (3)$$

$$R_{B\theta} = R_0'\{(X+x_2)/(1-ak) + (L-X-x_2)/(1-k)\} \quad (4)$$

where ak denotes the physical value exerting influence upon the sensor thermal resistance within the liquid.

Therefore, the sensor voltages are $$V_{A\theta} = I R_{A\theta} \quad (5)$$

$$V_{B\theta} = I R_{B\theta} \quad (6).$$

Therefore, the voltage difference in the sensor B between when inclined and when not inclined is $$\begin{aligned}\Delta V_{B\theta} &= V_o - V_{B\theta} \\ &= -IR_o'\{1/(1-ak) - 1/(1-k)\}x_2\end{aligned} \quad (7)$$

In other words, since the sensor voltage $V_0$ obtained when not inclined is decreased by $\Delta V_{B\theta}$ due to liquid level inclination, it is possible to eliminate the influence of level inclination by adding $\Delta V_{B\theta}$ to $V_{B\theta}$.

On the other hand, when the tank is inclined, a voltage difference $\Delta V_\theta$ is generated between the two sensors A and B as $$\begin{aligned}\Delta V_\theta &= V_{B\theta} - V_{A\theta} \\ &= IR_o'\{(x_2 - x_1)/(1-ak) - (x_2 - x_1)/(1-k)\} \\ &= -IR_o'\{1/(1-ak) - 1/(1-k)\}x_2/G\end{aligned} \quad (8)$$

where $1/G$ (>0) is $(x_1-x_2)/x_2 = l_1 \tan\theta/l_2$ $\tan\theta = l_1/l_2 = 1/G$ On the basis of the expressions (7) and (8), the following relationship can be established.

$$|\Delta V_{B\theta}| = |\Delta V_\theta| \cdot G.$$

By adding the above equation to $V_{B\theta}$, the sensor voltage $V_0$ can be obtained as $$\begin{aligned}V_{B\theta} + G \cdot \Delta V_\theta &= V_{B\theta} + G(V_{B\theta} - V_{A\theta}) = \\ IR_o'&\{X/(1-ak) + (L-X)/(1-k) + X_2/(1-ak) - \\ X_2/(1-k)\} &- IR_o'\{X_2/(1-ak) - X_2/(1-k)\} = \\ & IR_o'\{X/(1-ak) + (L-X)/(1-k)\} = V_o\end{aligned} \quad (9)$$

As described above, it is possible to calculate the sensor voltage $V_0$ obtained when the tank is not inclined on the basis of the sensor voltage $V_{B0}$, $V_{A\theta}$ obtained when inclined, as far as there exists a neutral position at which the liquid level is kept unchanged even when the tank is inclined.

The above equation (9) can be rewritten as $$V = V_B + P(V_B - V_A)$$

$$P = L_2/L_1$$

which has already been disclosed hereinbefore.

Further, when the sensor voltages $V_A$ and $V_B$ are replaced with the approximate sensor voltages $V_{Atc}'$ and $V_{Btc}'$, respectively, the above equation (9) can be rewritten as $$V_0 = V_{Btc}' + P(V_{Btc}' - V_{Atc}')$$

$$P = L_2/L_1$$

where $V_0$ denotes the approximate sensor voltage obtained when the liquid level is horizontal as described later herein.

Figure 9D:
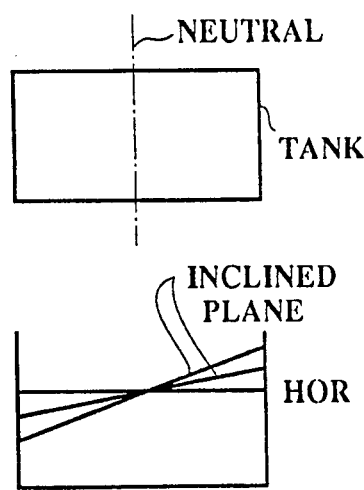
FIG. 9D is a view showing a liquid tank when seen from above and the side for assistance in explaining the neutral plane.
Figure 9E:
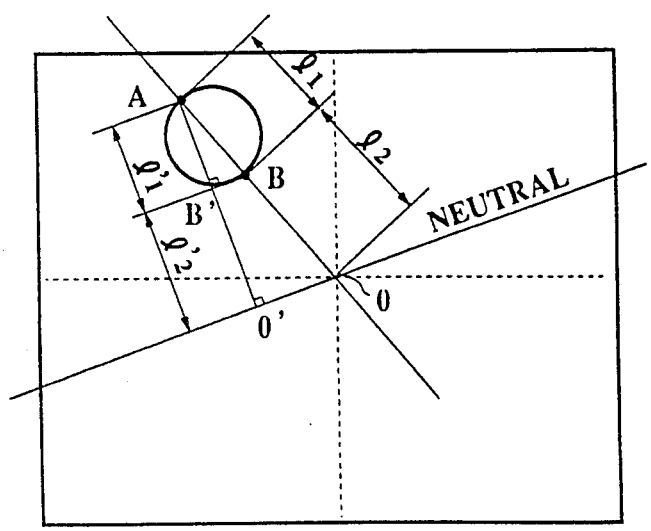
FIG. 9E is a graphical representation showing the sensor positions arranged in a straight line passing through a central position of the tank.

In the case where the tank is of box shape, the neutral liquid level is kept unchanged even when the liquid level various, as shown in FIG. 9D. Therefore, in the case of the box-shaped tank (rectangular when seen from above), two sensors A and B are arranged in a straight line passing through the central position O of the tank as shown in FIG. 9E. Under these conditions, the ratio in liquid level change of the sensor B to the difference between the two sensors A and B can be expressed with reference to FIG. 9E as follows:

$$(X_1 - X_2)/X_2 = l_1' \tan \theta / l_2' \tan \theta = l_1'/l_2' = l_1/l_2 = 1/G'$$

Since $G'$ is constant, it is possible to obtain the sensor voltage $V_0$ by adding $G' \Delta V_\theta$ to the sensor voltage $V_{B\theta}$ obtained where the tank is inclined as $$V_0 = V_{B\theta} + G'(V_{B\theta} - V_{A\theta})$$

Figure 9F:
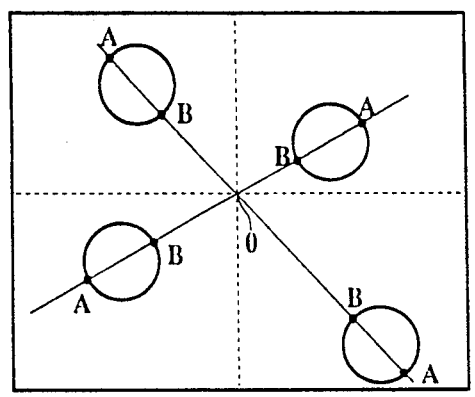
FIG. 9F is a graphical representation showing the various sensor positions within the tank.

Although the $l_1'$ and $l_2'$ change according to the sensor positions, the ratio of $l_1'/l_2' = G'$ can be always kept constant. This is because the two sensors A and B are arranged in a straight line and therefore the triangular $\Delta OAO'$ is similar to the triangular $\Delta BAB'$ in FIG. 9E. In other words, the above-mentioned compensating principle can be established whenever the two sensors A and B are arranged as shown in FIG. 9F. However, the value $l_1/l_2$ changes according to the sensor positions, and it is preferable to arrange the sensor A as remote as possible from the sensor B. Further, it is preferable to empirically determine the position of the sensor B within the tank.

Figure 9G:
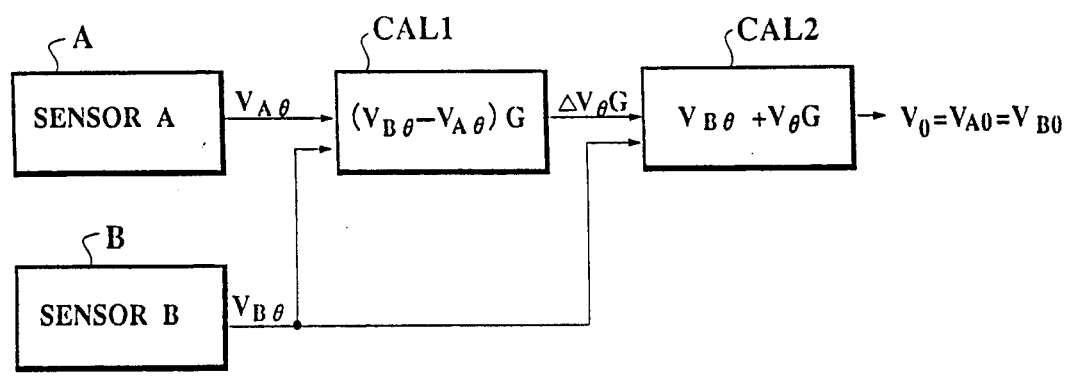
FIG. 9G is a block diagram showing the calculating sequence of the method of compensating for the inclined liquid level.

FIG. 9G shows a block diagram for assistance in explaining the above calculations. The sensor A outputs a sensor output $V_{A0} = V_0$ when the tank is not inclined but a sensor output $V_{A\theta}$ when inclined. The sensor B outputs a sensor output $V_{B0} = V_0$ when the tank is not inclined but a sensor output $V_{B\theta}$ when inclined. The first calculator CAL 1 calculates $\Delta V_\theta G = (V_{B\theta} - V_{A0})G$ and the second calculator CAL 2 calculates $V_0 = V_{B\theta} + \Delta V_\theta G$, as already explained.

With reference to a flowchart shown in FIG. 10 and data tables shown in FIG. 11, the sensing procedure of the second embodiment will be explained hereinbelow, which is executed in accordance with a control program stored in the CPU 4.

Control first activates the constant current generator 2 at time $t = t_0$ (in step S11), so that a constant current I is passed through both the liquid level sensor A and the inclination correcting sensor B after a predetermined rise time (in step S12). Control detects sensor voltages $V_A(t_n)$ and $V_B(t_n)$ as listed in a detection table S13A shown in FIG. 11, where the suffix A or denotes the sensor A or B and the suffix $(t_n)$ denotes at sampling times $t_1, t_2, \cdots t_n$. These detected data are stored in a first memory M1 (in step S14). Control checks whether the sampling number reaches a predetermined value (e.g. 300) (in step S15). If NO, the sampling operation is respected If YES, control deactivates the constant current generator at time $t_{n+1}$, so that the constant current I is stopped (in step S17). Control divides these sensor voltages $M1V_{A(tn)}$ and $M1V_{B(tn)}$ stored in a first memory M1 by the two initial voltages $M1V_{A(t1)}$ and $M1V_{B(t1)}$ stored in the first memory, respectively to eliminate the influence of ambient temperature (because the initial sensor voltages are determined by the initial resistances before heated and therefore determined only by the influence of the ambient temperature), as listed in a temperature correction table S18A shown in FIG. 11. These temperature correction date are stored in a second memory M2 (in step S18). Control further checks whether the stored sampled data number reaches a predetermined value (e.g. 300) (in step S19). If NO, the dividing operation is repeated. If YES, control calculates approximate sensor voltages $V_{Atc}'$ and $V_{Btc}'$ on the basis of the stored $M2V_{A(tn)}$ or $M2V_{B(tn)}$ in accordance with a linear approximation equation as listed in an approximation calculation table S20A shown in FIG. 11 or as indicated by a linear graph shown in FIG. 8B (in step S20). Finally, control calculates an inclination corrected sensor voltage (V) in accordance with the proportional equation as follows (in step 21):

$$V = V_{Btc}' + P(V_{Btc}' - V_{Atc}')$$

$$P = +L_2/L_1$$

Figure 8B:
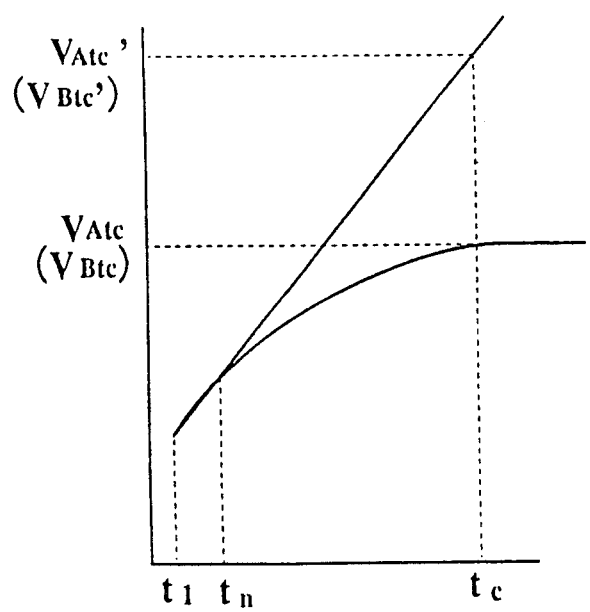
FIG. 8B is a graphical representation for assistance in explaining the linear approximation and the exponential approximation of the two sensor voltages.

Further, in the above step S20, it is also possible to calculate the inclination corrected sensor voltage in accordance with an exponential approximation equation based upon the time constant curve as shown in FIG. 8B.

In the second embodiment as described above, since an additional inclination correcting sensor B is provided and further two approximate sensor voltages can be calculated on the basis of the sampled data obtained in transient condition, it is possible to improve the response speed of the liquid level measurement under consideration of liquid level inclination.

With reference to FIGS. 12 to 13, a third embodiment of the present invention will be described hereinbelow.

In the second embodiment, an inclination correction sensor B is additionally provided to correct the influence of the inclination of the liquid level, on the assumption that the neutral level center of a liquid level does not change even if the liquid level is inclined. However, there exist some disadvantages as follows:

(a) The liquid level sensor A and the inclination correcting sensor B must be both disposed at least 5 cm or more apart from each other, in order to obtain a certain precision.

(b) A higher bit (e.g. 16 bits or higher) A-D converter 3 must be provided to accurately detect a small difference in sensor voltage between the two sensors, thus increasing the system cost.

(c) Two sensor dividing sections are required.

(d) The sensor characteristics of these two sensors must be matched with each other.

To overcome the above-mentioned problems, the inventors have repeatedly performed various vehicle travelling tests in order to quantitatively obtain the relationship between vehicle acceleration and fuel level motion by use of a single liquid level sensor. The obtained results are as follows:

(a) Liquid level inclination angle is determined mainly by acceleration generated in both vehicle longitudinal (front-back) and transversal (right-left) directions.

(b) The difference $\Delta L$ in liquid level is proportional to a product of acceleration G and distance r between the neutral level center 0 and the sensor position as $$\Delta L = r_0 \tan \theta = r \times (G/g)$$

where g denotes the gravitational acceleration.

(c) There exists the case where the upward and downward acceleration is considerably large than the frontward, backward, rightward and leftward acceleration. Although it is impossible to quantitatively obtain the influence of the upward and downward acceleration upon the liquid level inclination, since the fuel level changes momentarily in these acceleration, it is possible to neglect the influence of the up/down acceleration of vehicle motion by periodically detecting the fuel level at a period of 3 sec or more.

With reference to the attached drawings, the third embodiment will be described in further detail. The basis conception of this embodiment is to calculate the level difference (i.e. error) due to inclination by detecting vehicle acceleration.

In FIG. 12, the liquid level sensor A is disposed at a point a distance r away from the fuel tank center (the neutral level center) 0 at coordinates $(x_p, y_p)$, in which the ordinate denotes the vehicle longitudinal direction and the abscissa denotes the vehicle transversal direction. Further, a vehicle acceleration sensor C is additionally provided for the fuel tank 1 to detect vehicle acceleration or deceleration in both vehicle longitudinal and transversal directions. The output $V_c$ of this acceleration sensor C is also supplied to the CPU 4 via the A-D converter 3. The display unit 5 indicates the liquid level calculated on the basis of data detected by the liquid level sensor A and the acceleration sensor C and in accordance with programs stored in the CPU 4.

FIG. 13A is a table showing the relationship between vehicle acceleration directions and fuel level motion. In the table, minus sign (−) indicates that the fuel level decreases at the sensor point P in the fuel tank (so that the sensor voltage $V_A$ increases) and plus (+) sign indicates that the fuel level increases at the sensor point P in the fuel tank (so that the sensor voltage $V_A$ decreases). Further, $G_b$ denotes an acceleration indicative of liquid level backward rise motion caused when the vehicle is accelerated or driven along an uphill; $G_f$ denotes a deceleration indicative of liquid level frontward rise motion caused when the vehicle is decelerated or driven along a downhill; $G_l$ denotes an acceleration indicative of liquid level leftward rise motion caused when the vehicle is turned rightward; $G_r$ denotes liquid level rightward rise motion caused when the vehicle is turned leftward; and $G_u$ denotes an upward acceleration and $G_d$ denotes a downward acceleration, which both momentarily exert influence upon the liquid level change.

Further, the acceleration sensor C is so designed as to detect a minus (−) liquid level change when the vehicle is accelerated or driven along an uphill and a plus (+) liquid level change when the vehicle is decelerated or driven along a downhill.

Here, when $G_u$ and $G_d$ are disregarded, four combinations can be considered with respect to four accelerations, as listed by a table shown in FIG. 13B. That is, $(G_b+G_l)$ represents an acceleration caused when the vehicle is accelerated in left turn; $(G_b+G_r)$ represents an acceleration caused when the vehicle is accelerated in right turn; $(G_f+G_r)$ represents a deceleration caused when the vehicle is decelerated in right turn; and $(G_f+G_l)$ represents a deceleration caused when the vehicle is decelerated in left turn. The resultant acceleration can be calculated on the basis of Pythagorean proposition as listed in the same table shown in FIG. 13B. Further, the sign a (plus or minus) can be determined on the basis of comparison in absolute value between the two combined accelerations also as listed in the same table.

Once a resultant acceleration G can be determined, the liquid level change $\Delta L$ due to the acceleration or deceleration can be calculated as already described as follows:

$$\Delta L = r \tan \theta = r \times (G/g)$$

where r denotes a distance between the sensor position and the neutral level center and g denotes the gravitational acceleration.

Therefore, the liquid level sensor voltage difference $\Delta V_A$ to be corrected for inclination caused by acceleration or deceleration can be calculated as $$\Delta V_A = -r \times (G_{res}/g) \times (V_0 - V_F)/D_{max}$$

where $(V_0 - V_F)$ denotes a sensor voltage difference between when the liquid level is zero and when full; and $D_{max}$ denotes the maximum measurable depth. Here, it should be noted that if G is plus (+), since the liquid level is increased (+), the sensor voltage $\Delta V_A$ to be corrected is minus (−). If G is minus (−), the sensor voltage $\Delta V_A$ to be corrected is plus (+).

In FIG. 12, the level sensor A is located at a point where $x_p = y_p$. Without being limited thereto, it is of course possible to locate the level sensor A at any point where $x_p \neq y_p$. In this case, it is unnecessary to calculate the resultant acceleration. However, the acceleration G must be detected as x-direction component $G_x$ and y-direction component $G_y$ separately.

In this case, the liquid level sensor voltage difference $\Delta V_A$ to be corrected for inclination caused by acceleration or deceleration can be calculated as $$\Delta V_A = \; -x_p \times (G_x/g) \times (V_o - V_F)/D_{max}$$
$$-y_p \times (G_y/g) \times (V_o - V_F)/D_{max}$$

where $x_p$ and $y_p$ denote coordinates at which the level sensor A is located.

With reference to FIGS. 14A and 14B, calculation procedure of the liquid sensor voltage $\Delta V_A$ to be corrected in accordance with programs stored in the CPU will be described hereinbelow.

When the sensor is located at a point represented by coordinates $(x_p, y_p)$ where $x_p = y_p$, control detects vehicle acceleration G ($G_b$, $G_f$, $G_l$ and $G_r$) by the acceleration sensor C (in step S21), calculates a resultant acceleration $G_{res}$ ($G_b+G_l$, $G_b+G_r$; $G_f+G_r$; and $G_f+G_l$) under consideration of the plus or minus sign and in accordance with Pythagorean proposition (in step S22), and further calculates the sensor voltage difference $\Delta V_A$ (in step S23) as follows:

$$\Delta V_A = -rx(G_{res}/g) \times (V_0 - V_F)/D_{max}.$$

The calculated corrective sensor voltage $\Delta V_A$ is added to the steady-state sensor voltage $V_{tc}$ calculated in step S4 (shown in FIG. 5) (in step S24), before proceeding to step S5 (shown in FIG. 5).

Further, when the sensor is located at a point represented by coordinates $(x_p, y_p)$ where $x_p \neq y_p$, control detects vehicle acceleration components $G_x$ and $G_y$ (in step S21A) and calculates the sensor voltage difference $\Delta V_A$ (in step S22A) as follows:

$$\Delta V_A = -x_p \times (G_x/g) \times (V_o - V_F)/D_{max}$$
$$-y_p \times (G_y/g) \times (V_o - V_F)/D_{max}$$

The calculated corrective sensor voltage $\Delta V_A$ is added to the steady-state sensor voltage $V_{tc}$ calculated in step S4 (in step S24A), before proceeding to step S5 (both shown in FIG. 5).

Further, there exists certain cases where the sign of the resultant acceleration $G_{res}$ fluctuates violently. In this case, it is preferable to store a program in the CPU so that the resultant acceleration G is once stored in the memory of the CPU and the liquid level is calculated on the basis of the preceding data stored in the memory unit.

As described above, in the third embodiment, since the liquid level inclination can be corrected on the basis of the detected vehicle acceleration by use of a single level sensor and further since an A-D converter of higher bits is not required, it is possible to simplify the system configuration and therefore to reduce the system cost.

The fourth embodiment of the present invention will be described hereinbelow with reference FIGS. 15 and 16.

In the first (basic) embodiment, since the level sensor A is kept heated for a few seconds (e.g. 3 sec) between $t_1$ to $t_n$ for each current pulse as shown in FIGS. 4A and 4B, when the fuel tank 1 is vibrated during vehicle travel and therefore the liquid level fluctuates violently, there exists a problem in that the rise time between $t_0$ and $t_0'$ of the sensor voltage is unstable as compared with when the vehicle is at a standstill, so that the data fluctuate and therefore an error is inevitably produced when the steady-state sensor voltage $V_{tc}$ is calculated in accordance with a liner approximation equation.

The feature of the fourth embodiment is to provide a vehicle speed sensor and a steering wheel angle sensor in order to interrupt the fuel level measurement process or to calculate the fuel level on the basis of previously stored data as an averaged level.

Figure 15:
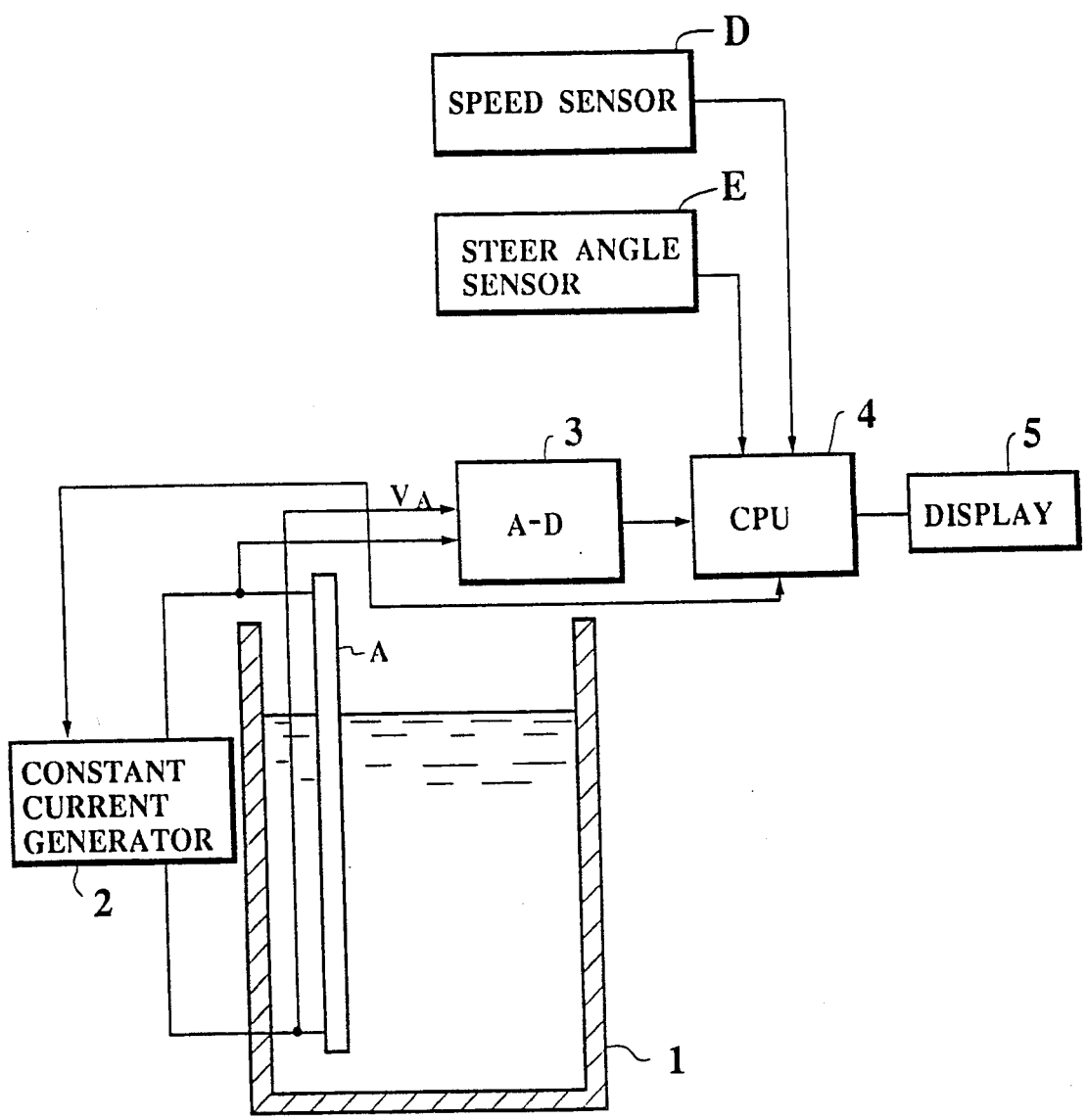
FIG. 15 is a schematic block diagram showing a fourth embodiment thereof.
Figure 16:
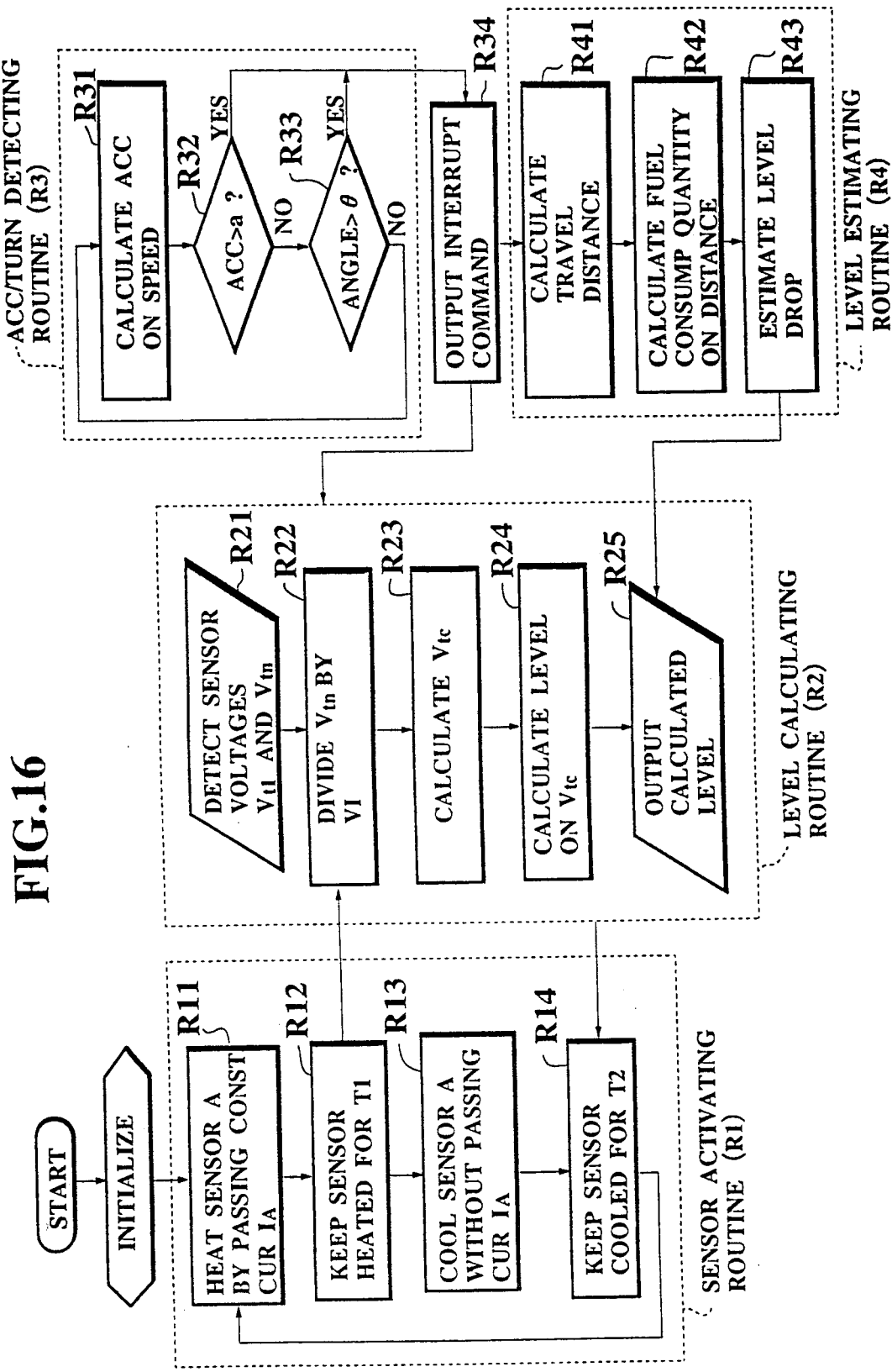
FIG. 16 is a flowchart for assistance in explaining the sensing procedure of the fourth embodiment thereof.

In FIG. 15, a vehicle speed sensor D and a steering wheel angle sensor E are connected to the CPU 4, in addition the first embodiment shown in FIG. 3, and further the constant current generator 2 is connected to the CPU 4.

Figure 10:
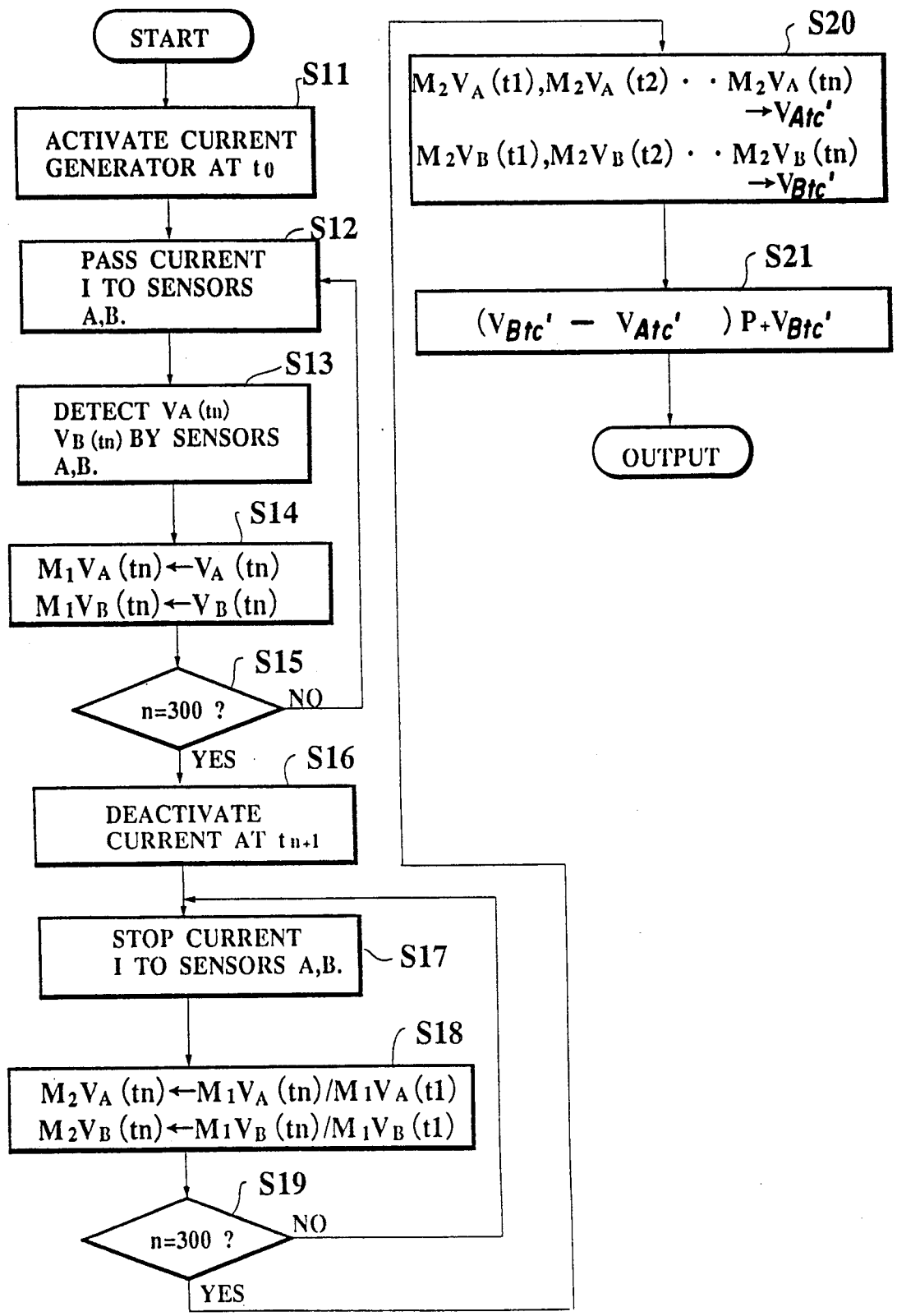
FIG. 10 is a flowchart for assistance in explaining the sensing procedure of the second embodiment thereof.
Figure 11:
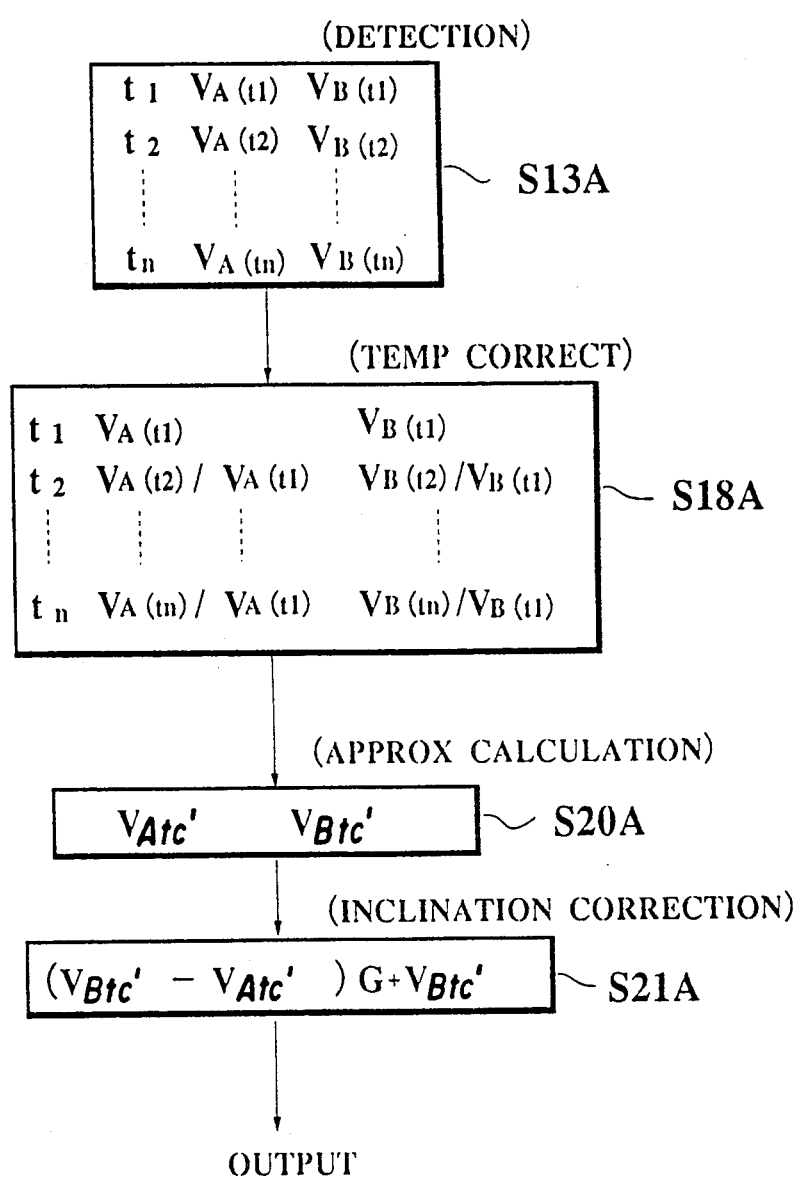
FIG. 11 is data tables for assistance in explaining sequentially sampled sensor voltage data stored in the CPU shown in FIG. 7.

With reference to FIG. 10, the fuel level sensing procedure of the fourth embodiment will be described, in which four routines are executed to detect the fuel level.

The first routine R1 is a program for passing constant current through the level sensor A to periodically heat the level sensor A. That is, control first heats the level sensor A by passing constant current $I_A$ therethrough (in step R11), keeps the sensor A heated for a first predetermined period $T_1$ (in step $R_{12}$), cools the level sensor A without passing constant current $I_A$ therethrough (in step $R_{13}$), and keeps the sensor A cooled till a second predetermined period $T_2$ (in step $R_{14}$).

The second routine $R_2$ is a program for calculating the fuel level, which is the same as the procedure shown in FIG. 5. That is, control first detect sensor voltages $V_{tn}$ at times $t_1$ to $t_n$ on the basis of data stored in step $R_{12}$ of the first routine $R_1$ (in step $R_{21}$), divides the detected sensor voltage $V_{tn}$ by $V_{t1}$ to eliminate the influence of ambient temperature ($R_{22}$), calculate the steady-state sensor voltage $V_{tc}$ at time $t_c$ by the linear approximation (in step $R_{23}$), converts the calculated steady-state sensor voltage $V_{tc}$ into a liquid level L (in step $R_{24}$), and outputs the obtained liquid level L to the display unit 5 (in step $R_{25}$).

The third routine R3 is a program for generating an interrupt command signal to the second routine R2, when the liquid level fluctuates violently. That is, control first calculates an acceleration Acc on the basis of vehicle speed detected by the speed sensor D (in step R31), and checks whether the calculated acceleration Acc is larger than a predetermined value a (in step R32). If YES, control outputs an interrupt command signal to the second routine R2 to stop outputting the calculated level L. If NO (in step S32), control checks whether the steering wheel angle detected by the steering wheel angle sensor E is larger than a predetermined value 0 (in step R33). If YES, control outputs an interrupt command signal to the second routine R2 to stop outputting the calculated level 1. If NO (in step S33), control returns to step R31.

The fourth routine R4 is a program for calculating an estimated liquid level drop when an interrupt command signal is kept generated and therefore the liquid level measurement procedure is being interrupted. That is, when an interrupt command signal is outputted, control calculates a travel distance on the basis of the detected vehicle speed and the time duration while the interrupt command signal is kept generated (in step R41), calculates a quantity of fuel consumed while the vehicle travels at the calculated distance (in step R42) and calculates a liquid level drop (in step R43). The estimated value is applied to step R25, so that the estimated value is subtracted from the level L calculated before interruption. In this embodiment, it is also preferable to execute the level estimating routine R4 only when the interrupt command signals are repeatedly outputted beyond a predetermined number of times.

Figure 17:
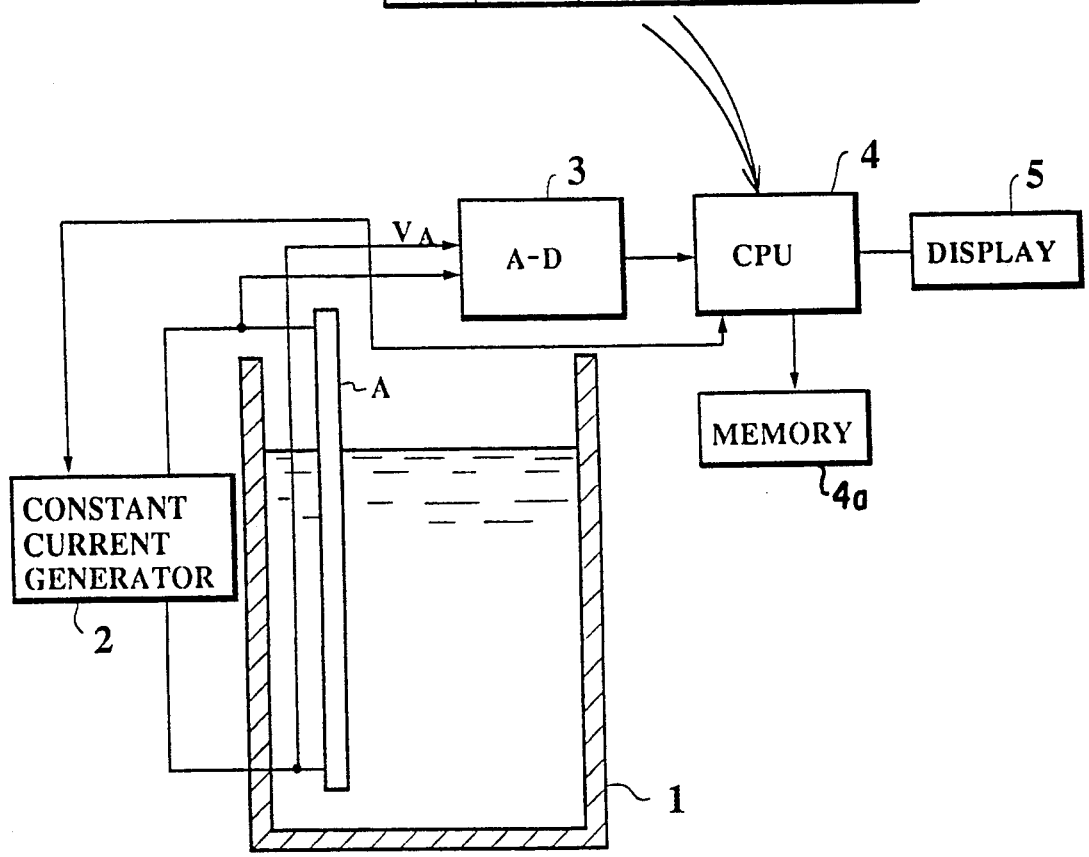
FIG. 17 is a schematic block diagram showing a modification of the fourth embodiment thereof.

FIG. 17 is a modification of the fourth embodiment, in which liquid level data $V_{t1}$ to $V_{tn}$ are kept stored for a predetermined period (from the first period to the mth period) in the memory 4a, and the control calculates fuel level on the basis of the stored sensor voltage data when the interrupt signal is kept generated.

As described above, in the fourth embodiment, it is possible to more stably detect the liquid level even when the fuel level fluctuates violently or when the S/N ratio of the sensor voltage is decreased markedly.

Figure 18:
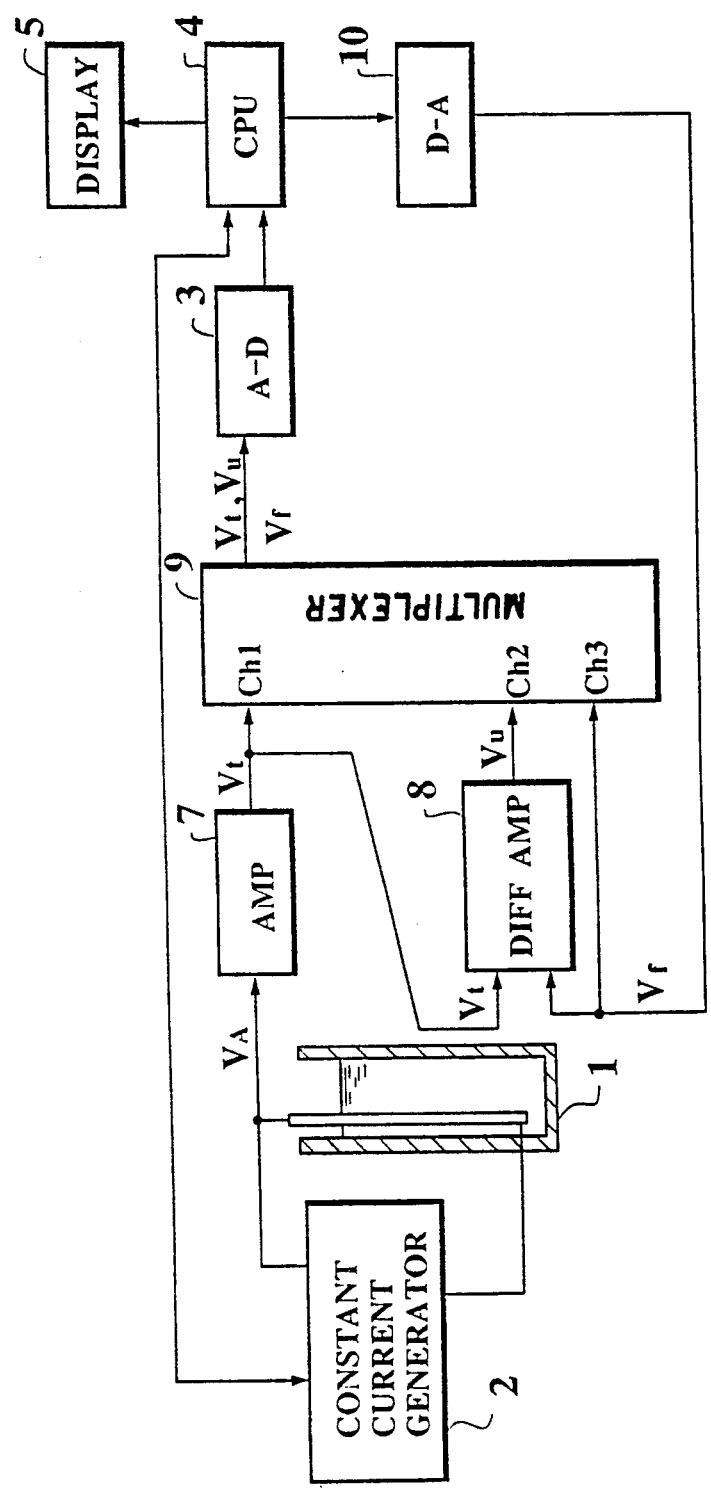
FIG. 18 is a schematic block diagram showing a fifth embodiment thereof.
Figure 19A:
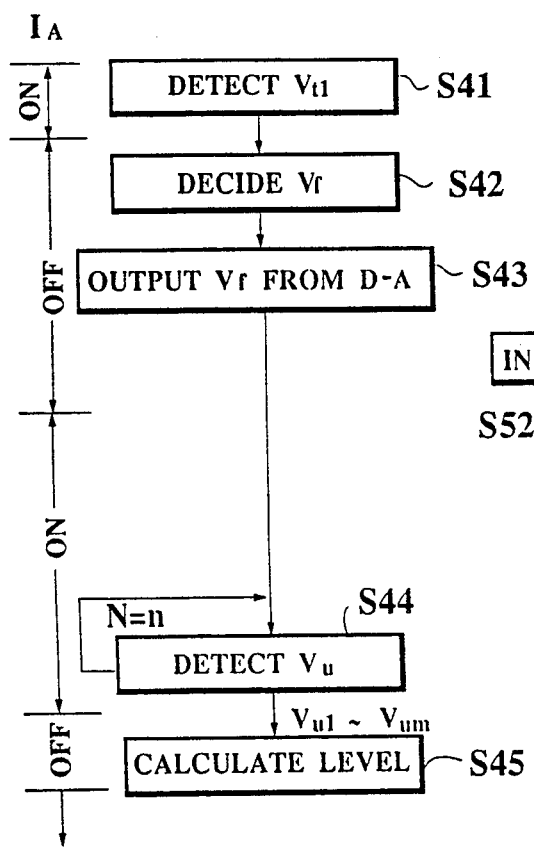
FIG. 19A is a flowchart for assistance in explaining the sensing procedure of the fifth embodiment.
Figure 19B:
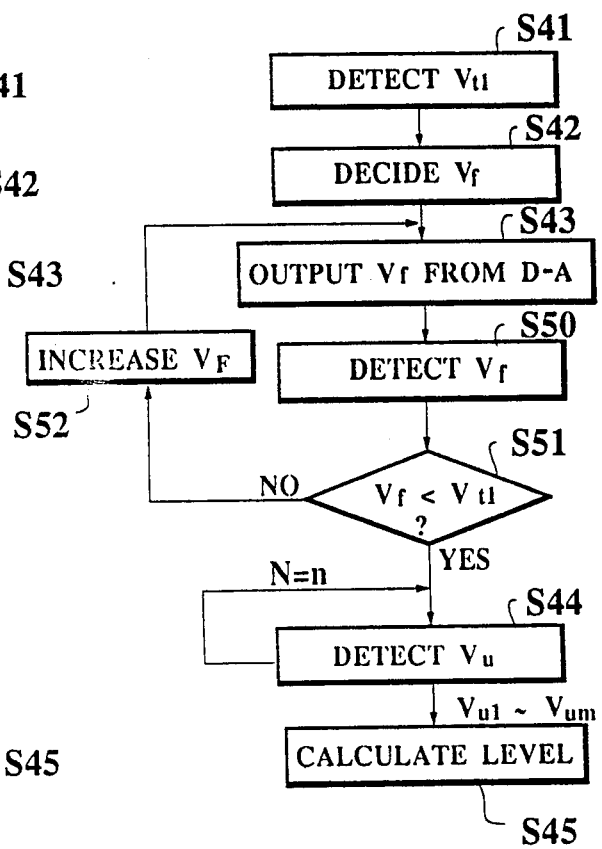
FIG. 19B is a flowchart for assistance in explaining the sensing procedure of a modification of the fifth embodiment.
Figure 20A:
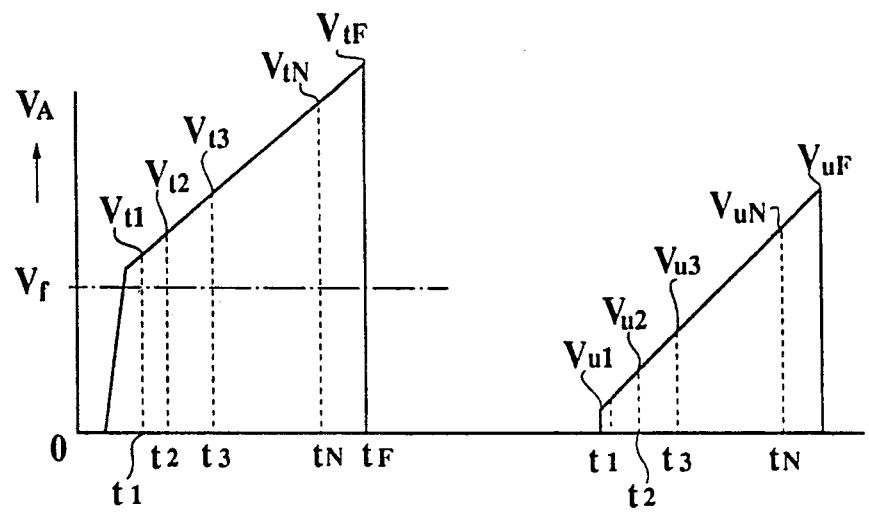
FIG. 20A is a waveform diagram for assistance in explaining the differential (offset) sensor voltages of the fifth embodiment.

With reference to FIGS. 18 to 20, a fifth embodiment of the present invention will be described, in which the sensor voltage range can be reduced and therefore the conversion range of the A-D converter 3 can be decreased to reduce the cost thereof.

Figure 20B:
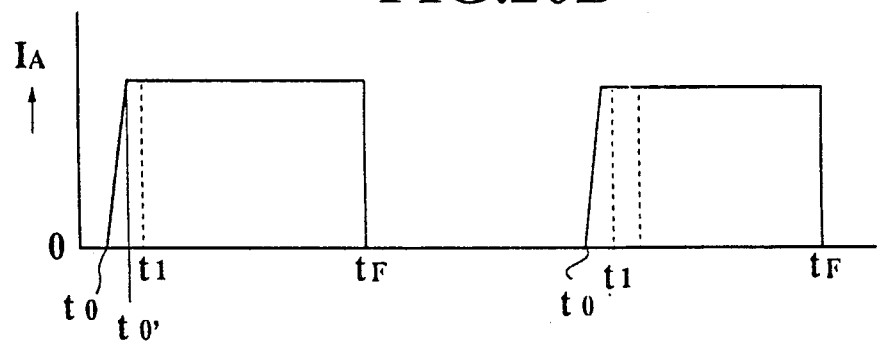
FIG. 20B is a waveform diagram showing a constant current pulse periodically passed through the liquid level sensor, which is similar to FIG. 4A.
Figure 20C:
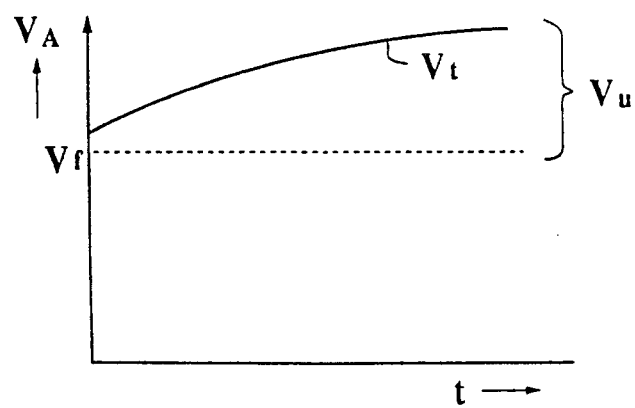
FIG. 20C is a waveform diagram showing the differential sensor voltages with respect to time, in the fifth embodiment.

In FIG. 18, the liquid level sensing system further comprises an amplifier 7, a differential amplifier 8, a multiplexer 9, and a D-A converter 10, in addition to the elements shown in FIG. 3. The sensor voltages $V_A$ sampled at times $t_n$ are amplified by the amplifier to $V_t$ only when constant current is kept passed through the level sensor A, applied to the A-D converter 3 through a channel Ch1 of the multiplexer 9. On the other hand, a digital reference voltage $V_f$ is converted into an analog reference voltage by the D-A converter 10. The two voltages $V_t$ and $V_f$ are applied to the differential amplifier 8 to output $V_u (V_t - V_f)$. The outputted differential sensor voltages $V_u$ are also applied to the A-D converter 3 via a channel Ch2 of the multiplexer 9. Further, the reference voltage $V_f$ is also applied to the A-D converter 3 via a channel ch3 of the multiplexer 9. Here, it should be noted that the reference (offset) voltage $V_f$ must be lower than the initial sensor voltage $V_{t1}$, as shown in FIG. 20C.

With reference to a flowchart shown in FIG. 19A, the detecting procedure of this embodiment will be described hereinbelow. The constant current $I_A$ as shown in FIG. 20B is generated by the constant current generator 2 and passed through the level sensor A. This current $I_A$ is passed through the sensor A from $t_0$ to $t_F$ to heat the sensor A but not passed therethrough from $t_F$ to $t_0$ to cool the sensor A. The on- or off-duration is also indicated in FIG. 19A.

Control (CPU) first detect a sensor voltage $V_{t1}$ at time $t_1$ after the current $I_A$ has risen at time $t_0$ and transmitted via the amplifier 7, the multiplexer 9 and the A-D converter 3 (in step S41), and decides a reference (offset) voltage $V_f$ a little lower than the initial sensor voltage $V_{t1}$ after the current $I_A$ is once stopped (in step S42).

The decided reference voltage $V_f$ is converted into an analog voltage by the D-A converter 10 (in step S43). Thereafter, the current $I_A$ is passed again through the sensor A, and control detects offset sensor voltages $V_u = V_t - V_f$ at times from $t_1$ to $t_n$ until a predetermined number N=n of offset sensor voltages $V_u$ can be detected (in step S44). Control calculates a liquid level L in accordance with the level calculating procedure as shown by steps S2 to S5 (as shown in FIG. 5) (in step S45).

FIG. 19B shows a modification of this embodiment, in which control detects the outputted reference voltage $V_f$ (in step S50), checks whether the reference (offset) voltage $V_f$ lies within a predetermined range in comparison with the initial sensor voltage $V_{t1}$ (in step S51). If YES, control proceeds to step S44. However, if NO (in step S51), control adjusts the reference voltage $V_f$, so that an appropriate reference voltage can be decided in comparison with the initial sensor voltage $V_{t1}$. The above steps S51 and S52 are useful when the liquid level and/or the ambient temperature fluctuate violently. For example, when the level sensor voltage fluctuates from 0 to 5 V at ambient temperature from $-20+C$. to $60+C$., it is possible to use the A-D converter with an inputtable voltage range of 2.5 V.

As described above, in this embodiment, since differential sensor voltages $(V_u = V_t - V_f)$ are A-D converted by the A-D converter 3, it is possible to reduce the voltage range applied to the A-D converter 3, thus economizing the cost of the A-D converter 3.

As described above, in the heat radiating type liquid level sensing system and the method therefor according to the present invention, a constant current pulse is periodically passed through the level sensor to heat it; level sensor voltages are sampled at predetermined time intervals when the level sensor is being heated; the sampled sensor voltages are divided by the initial sensor voltage to eliminate the influence of ambient temperature and further to obtain an average sensor voltage gradient with respect to time for each current pulse; a steady-state sensor voltage is calculated on the basis of the initial level sensor voltage and the obtained gradient and in accordance with an approximation equation; a liquid level is calculated and displayed on the basis of the calculated steady-state sensor voltage. Therefore, it is possible to eliminate the use of an additional ambient temperature correcting sensor and further to increase the sensing response speed.

In addition, since the inclination correcting sensor or an acceleration sensor is provided, it is possible to reliably detect the liquid level even when the liquid level is inclined. Further, when the system is mounted on an automotive vehicle, since the vehicle speed sensor and the steering wheel angle sensor are provided, it is possible to interrupt the system operation when fuel level fluctuates violently. Further, it is preferable to generate a reference (offset) sensor voltage to reduce the signal voltage range of the liquid level sensor.

What is claimed is:

1. A heat radiating type liquid level sensing system for sensing liquid level in a tank which is subject to being inclined, comprising:
   (a) a single resistive level sensor immersed in a liquid within a tank when said liquid is present in said tank;
   (b) a constant current generator connected across said resistive level sensor,
   (c) said constant current generator periodically generating a constant current pulse passed through said resistive level sensor in such a manner as to thereby generate radiating heat in said resistive level sensor and to generate level sensor voltages in response to the liquid level in the tank at said resistive level sensor;
   (d) a storage device communicating with said resistive level sensor and storing an initial level sensor voltage;
   (e) a divider device communicating with said resistive level sensor and said storage device and dividing level sensor voltages sampled at predetermined time intervals when the resistive level sensor is being heated by the constant current pulse, by the stored initial level sensor voltage, to obtain level sensor voltage ratios;
   (f) a calculating device communicating with said divider device, for calculating an approximate level sensor voltage on the basis of the obtained level sensor voltage ratios in accordance with a first approximation formula, and a liquid level on the basis of the calculated approximate level sensor voltage in accordance with a proportional equation;
   (g) a display communicating with said calculating device, for displaying the calculated liquid level;

(h) a single resistive inclination correcting sensor immersed in the liquid when the liquid is present and heated by the constant current pulse periodically generated by said constant current generator in such a manner as to thereby generate inclination correcting level sensor voltages in response to the liquid level in the tank at said inclination correcting sensor;

(i) a second storage device communicating with said inclination correcting sensor, for storing an initial inclination correcting sensor voltage;

(j) a second divider device communicating with said inclination correcting sensor and said second storage device, for dividing inclination correcting sensor voltages sampled at predetermined time intervals when the inclination correcting sensor is being heated, by the stored initial inclination correcting sensor voltage, to obtain correcting level sensor voltage ratios;

(k) a second calculating device communicating with said second divider device, for calculating an approximate inclination correcting level sensor voltage on the basis of the obtained inclination correcting level sensor voltage ratios in accordance with a second approximation formula, and an approximate horizontal liquid level sensor voltage on the basis of the two calculated approximate sensor voltages in accordance with a proportional equation as $$V_0 = V_{Btc'} + P(V_{Btc'} - V_{Atc'})$$

$$P = L_2/L_1$$

where $V_0$ denotes the approximate horizontal level sensor voltage obtained when the tank is not inclined; $V_{Atc'}$ denotes the calculated approximate level sensor voltage; $V_{Btc'}$ denotes the calculated approximate inclination correcting level sensor voltage; $L_1$ denotes a distance between said level sensor and said resistive inclination correcting sensor; and $L_2$ denotes a distance between the resistive inclination correcting sensor and a neutral level plane on a liquid in the tank.

2. The heat radiating type liquid level sensing system of claim 1, wherein first the approximation formula is a linear approximation equation.

3. The heat radiating type liquid level sensing system of claim 1, wherein the first approximation formula is an exponential approximation equation.

4. The heat radiating type liquid level sensing system of claim 1, wherein the second approximation formula is a linear approximation equation.

5. The heat radiating type liquid level sensing system of claim 1, wherein the second approximation formula is an exponential approximation equation.

6. A method of sensing liquid level in a tank which is subject to being inclined, the method using only two sensors, comprising the steps of:

(a) passing constant current pulses generated by a constant current generator through a single resistive heat radiating liquid level sensor immersed in liquid in a tank when the liquid is present in the tank to periodically generate radiating heat in the resistive level sensor in such a manner as to thereby generate level sensor voltages;

(b) detecting level sensor voltages sampled at predetermined time intervals when the level sensor is being heated;

(c) storing an initial level sensor voltage;

(d) dividing the detected level sensor voltages by the stored initial level sensor voltage to obtain level sensor voltage ratios with respect to time;

(e) calculating an approximate sensor voltage on the basis of the obtained voltage ratios in accordance with a first approximation equation;

(f) calculating a liquid level on the basis of the calculated approximate sensor voltage;

(g) passing constant current pulses generated by said constant current generator through a single resistive inclination correcting sensor immersed in liquid in a tank when the liquid is present in the tank to generate radiating heat in the resistive inclination correcting sensor, in such a manner as to thereby generate correcting sensor voltages;

(h) detecting correcting sensor voltages sampled at predetermined time intervals when the resistive inclination correcting sensor is being heated;

(i) storing an initial correcting sensor voltage;

(j) dividing the detected correcting sensor voltages by the stored initial correcting sensor voltage to obtain correcting sensor voltage ratios with respect to time;

(k) calculating an approximate correcting level sensor voltage on the basis of the obtained correcting sensor voltage ratios in accordance with a second approximation equation and an approximate horizontal liquid level on the basis of the calculated approximate sensor voltage of the resistive heat radiating liquid level sensor and the approximate correcting level sensor voltage of the resistive inclination correcting sensor in accordance with a proportional equation as $$V_0 = V_{Btc'} + P(V_{Btc'} - V_{Atc'})$$

$$P = L_2/L_1$$

where $V_0$ denotes the approximate horizontal level sensor voltage obtained when the tank is not inclined; $V_{Atc'}$ denotes the calculated approximate level sensor voltage; $V_{Btc'}$ denotes the calculated approximate correcting level sensor voltage; $L_1$ denotes a distance between said level sensor and said inclination correcting sensor; and $L_2$ denotes a distance between the correcting sensor and a neutral level plane on a liquid in the tank.

7. The method of sensing liquid level of claim 6, wherein the first approximation equation is a linear approximation equation.

8. The method of sensing liquid level of claim 6, wherein the first approximation equation is an exponential approximation equation.

9. The method of sensing liquid level of claim 6, wherein the second approximation equation is a linear approximation equation.

10. The method of sensing liquid level of claim 6, wherein the second approximation equation is an exponential approximation equation.

* * * * *